US012776034B2

(12) United States Patent
Shriram et al.

(10) Patent No.: US 12,776,034 B2
(45) Date of Patent: Oct. 27, 2026

(54) INCREASING IMAGE QUALITY IN ULTRASOUND IMAGES DUE TO POOR FACIAL RENDERING

(71) Applicant: GE Precision Healthcare LLC, Waukesha, WI (US)

(72) Inventors: KS Shriram, Bengaluru (IN); Rahul Venkataramani, Bengaluru (IN); Chandan Kumar Aladahalli, Bengaluru (IN); Stephan Anzengruber, Zipf (AT)

(73) Assignee: GE PRECISION HEALTHCARE LLC, Waukesha, WI (US)

(*) Notice: Subject to any disclaimer, the term of this patent is extended or adjusted under 35 U.S.C. 154(b) by 300 days.

(21) Appl. No.: 18/486,038

(22) Filed: Oct. 12, 2023

(65) Prior Publication Data

US 2025/0124569 A1 Apr. 17, 2025

(51) Int. Cl.
*G06T 7/00* (2017.01)
*G06T 7/174* (2017.01)
(Continued)

(52) U.S. Cl.
CPC ............ *G06T 7/0012* (2013.01); *G06T 7/174* (2017.01); *G06T 7/60* (2013.01); *G06T 7/70* (2017.01);
(Continued)

(58) Field of Classification Search
CPC ... G06T 7/60; G06T 7/70; G06T 2207/30201; G06T 2207/30044; G06T 2207/10132;
(Continued)

(56) References Cited

U.S. PATENT DOCUMENTS

RE43,900 E * 1/2013 Wiesauer ............ G01S 15/8993 850/10
2011/0255762 A1* 10/2011 Deischinger ........... A61B 8/469 600/443
(Continued)

OTHER PUBLICATIONS

Cuingnet, RÃ © mi, et al. "Where is my baby? A fast fetal head auto-alignment in 3D-ultrasound." 2013 IEEE 10th International Symposium on Biomedical Imaging. IEEE, 2013. (Year: 2013).*
(Continued)

*Primary Examiner* — Sumati Lefkowitz
*Assistant Examiner* — Connor L Hansen
(74) *Attorney, Agent, or Firm* — McCoy Russell LLP

(57) ABSTRACT

Methods and systems are provided for identifying a mid-sagittal plane (MSP) in a medical image. In one example, a method for an image processing system comprises obtaining an input volume acquired with an ultrasound imaging system, entering the input volume as input to a segmentation model trained to output a segmentation mask that identifies a segmented fetal head, a first segmented orbit, and a second segmented orbit, identifying a mid-sagittal plane (MSP) of the fetal head using the segmented first orbit and the segmented second orbit, visually displaying the MSP on the segmented fetal head, in response to determining the MSP is not an acquired plane, alerting a user of poor facial rendering or a possibility of poor facial rendering and prompting the user to reorient an ultrasound probe and reacquire the input volume, and displaying the input volume and/or saving the input volume in memory.

13 Claims, 15 Drawing Sheets

(51) Int. Cl.

| | |
|---|---|
| ***G06T 7/60*** | (2017.01) |
| ***G06T 7/70*** | (2017.01) |
| ***G06V 40/10*** | (2022.01) |

(52) U.S. Cl.
CPC .... *G06V 40/10* (2022.01); *G06T 2207/10132* (2013.01); *G06T 2207/20081* (2013.01); *G06T 2207/30044* (2013.01); *G06T 2207/30201* (2013.01); *G06V 2201/03* (2022.01)

(58) Field of Classification Search
CPC ........ G06T 2207/30004; G06T 7/0012; G06V 10/25; G06V 40/10; A61B 8/0866; A61B 8/5223; A61B 8/466; A61B 8/483; A61B 8/463; A61B 8/0833
See application file for complete search history.

(56) References Cited

U.S. PATENT DOCUMENTS

| | | | | |
|---|---|---|---|---|
| 2020/0113542 | A1* | 4/2020 | Perrey .................. | A61B 8/4254 |
| 2023/0394655 | A1* | 12/2023 | Ben Bashat ......... | A61B 5/0042 |
| 2024/0180517 | A1* | 6/2024 | Giphart .................. | A61B 3/113 |

OTHER PUBLICATIONS

Cuingnet, Remi, et al. "Where is my baby? A fast fetal head auto-alignment in 3D-ultrasound." 2013 IEEE 10th International Symposium on Biomedical Imaging. IEEE, 2013. (Year: 2013).*

Nielsen, Michael A. Neural Networks and Deep Learning, Determination Press, Jan. 1, 1970, neuralnetworksanddeeplearning.com/chap2.html. (Year: 2019).*

Sun, T., "Key Factors in Acquiring an accurate 3D Ultrasound Volume," Voulson Club Website, Available Online at. https://www.volusonclub.net/empowered-womens-health/key-factors-in-acquiring-an-accurate-3d-ultrasound-volume/#:~:text=To%20ensure%20a%20successful%203D,volume%20display%20and%20volume%20analysis., Dec. 5, 2023, 8 pages.

* cited by examiner

1200

1300

1400

1500

INCREASING IMAGE QUALITY IN ULTRASOUND IMAGES DUE TO POOR FACIAL RENDERING

TECHNICAL FIELD

Embodiments of the subject matter disclosed herein relate to ultrasound imaging, and more particularly, to improving image quality for ultrasound imaging.

BACKGROUND

Medical ultrasound is an imaging modality that employs ultrasound waves to probe the internal structures of a body of a patient and produce a corresponding image. For example, an ultrasound probe comprising a plurality of transducer elements emits ultrasonic pulses which reflect or echo, refract, or are absorbed by structures in the body. The ultrasound probe then receives reflected echoes, which are processed into an image. For example, a medical imaging device such as an ultrasound imaging device may be used to obtain images of a heart, uterus, liver, lungs, and various other anatomical regions of a patient. Ultrasound images of the internal structures may be saved for later analysis by a clinician to aid in diagnosis and/or displayed on a display device in real time or near real time. However, ultrasound images of a fetal head may be prone to poor image quality due to poor face rendering.

BRIEF DESCRIPTION

In one example, a method includes obtaining an input volume acquired with an ultrasound imaging system, entering the input volume as input to a model trained to output a mask that identifies a fetal head, a first orbit, and a second orbit, identifying a mid-sagittal plane (MSP) of the fetal head using the first orbit and the second orbit, visually displaying the MSP on the fetal head, in response to determining the MSP is not an acquired plane, alerting a user of poor facial rendering or a possibility of poor facial rendering and prompting the user to reorient an ultrasound probe and reacquire the input volume, and displaying the input volume and/or saving the input volume in memory.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Medical ultrasound imaging typically includes the placement of an ultrasound probe including one or more transducer elements onto an imaging subject, such as a patient, at the location of a target anatomical feature (e.g., a fetal head, etc.). Images are acquired by the ultrasound probe and are displayed on a display device in real time or near real time (e.g., the images are displayed once the images are generated and without intentional delay). The operator of the ultrasound probe may view the images and adjust various acquisition parameters and/or the position of the ultrasound probe in order to obtain high-quality images of the target anatomical feature (e.g. the fetal head).

To achieve acceptable facial rendering of the fetal head, and more specifically, the fetal face, an anterior surface of the fetal head is captured with high resolution. By identifying a mid-sagittal plane (MSP), images may be acquired wherein the anterior surface of the fetal head is captured with high resolution. The MSP is perpendicular to the anterior surface or posterior surface of the head. Additionally, the MSP is an axis of symmetry of the fetal face that passes between orbits. As such, this makes the MSP a reliable anatomical marker for determining an orientation of the fetal head. For this reason, it is desired that the MSP is an acquired plane rather than an oblique plane/reconstructed plane.

However, varying the position of the ultrasound probe to identify the MSP of the fetal head to acquire an optimal image (e.g., of a desired quality) can be challenging, and may prove to be time intensive. Often times, MSP is not properly identified by the operator, resulting in poor image quality due to poor fetal face rendering. A frequency of obtaining images with poor fetal face rendering may be reduced by identifying the MSP of a fetal head based on output from a segmentation model. While this example describes a segmentation approach to identify the orbits, alternative approaches may include general detection and/or localization. The segmentation model may output a segmented fetal head and segmented orbits. The MSP may be analytically determined using the segmented orbits and visualized on the segmented fetal head. Visualization of the MSP on the segmented fetal head may enable the MSP to be categorized as an acquired plane or an oblique/reconstructed plane. In response to the MSP being an oblique/reconstructed plane, feedback and recommendations may be provided to the user. More specifically, it may be suggested that the user reorient the probe and re-acquire the volume when poor facial rendering may be expected.

Figure 1:
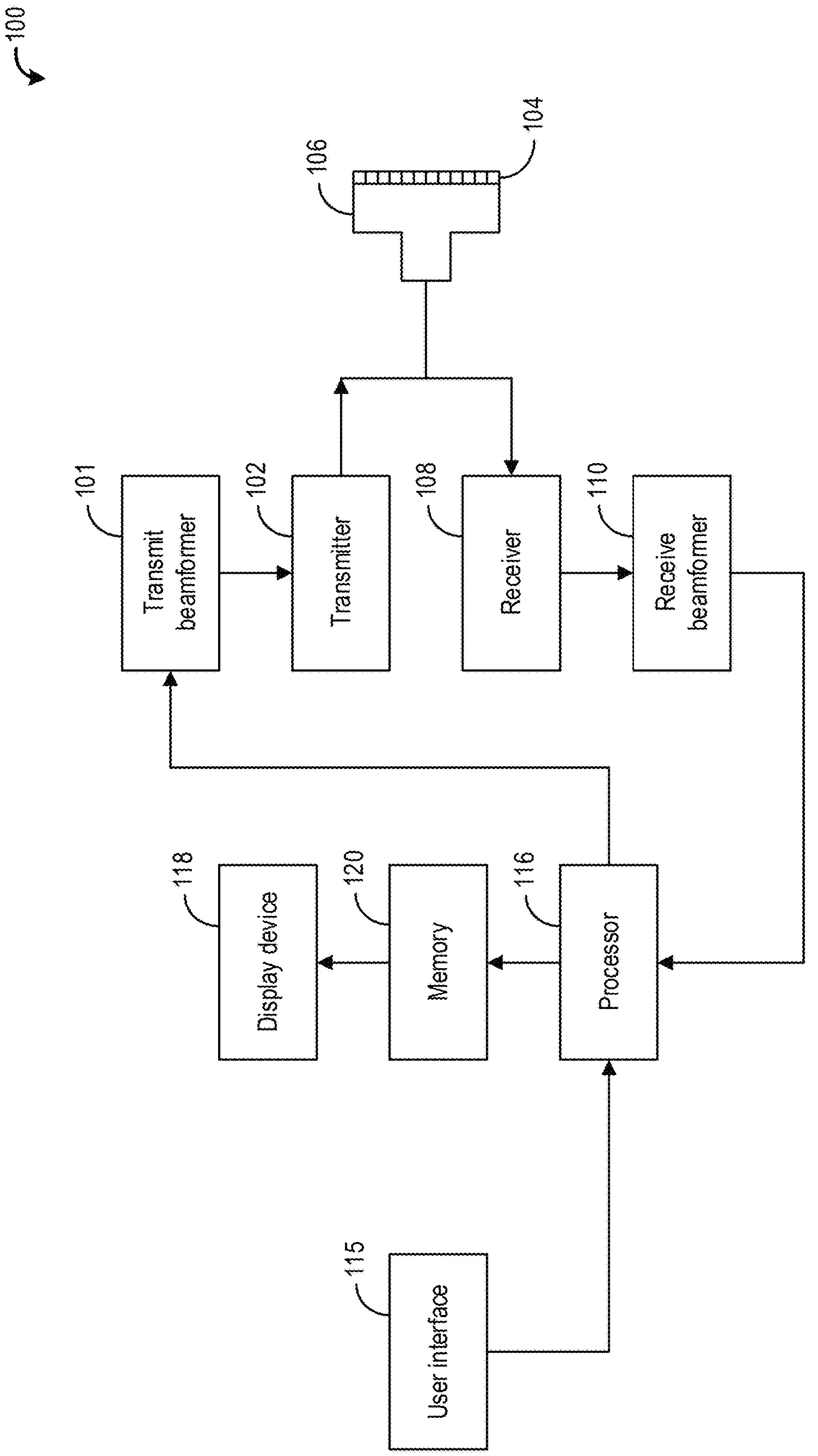
FIG. 1 shows a block diagram of an exemplary embodiment of an ultrasound system.
Figure 2:
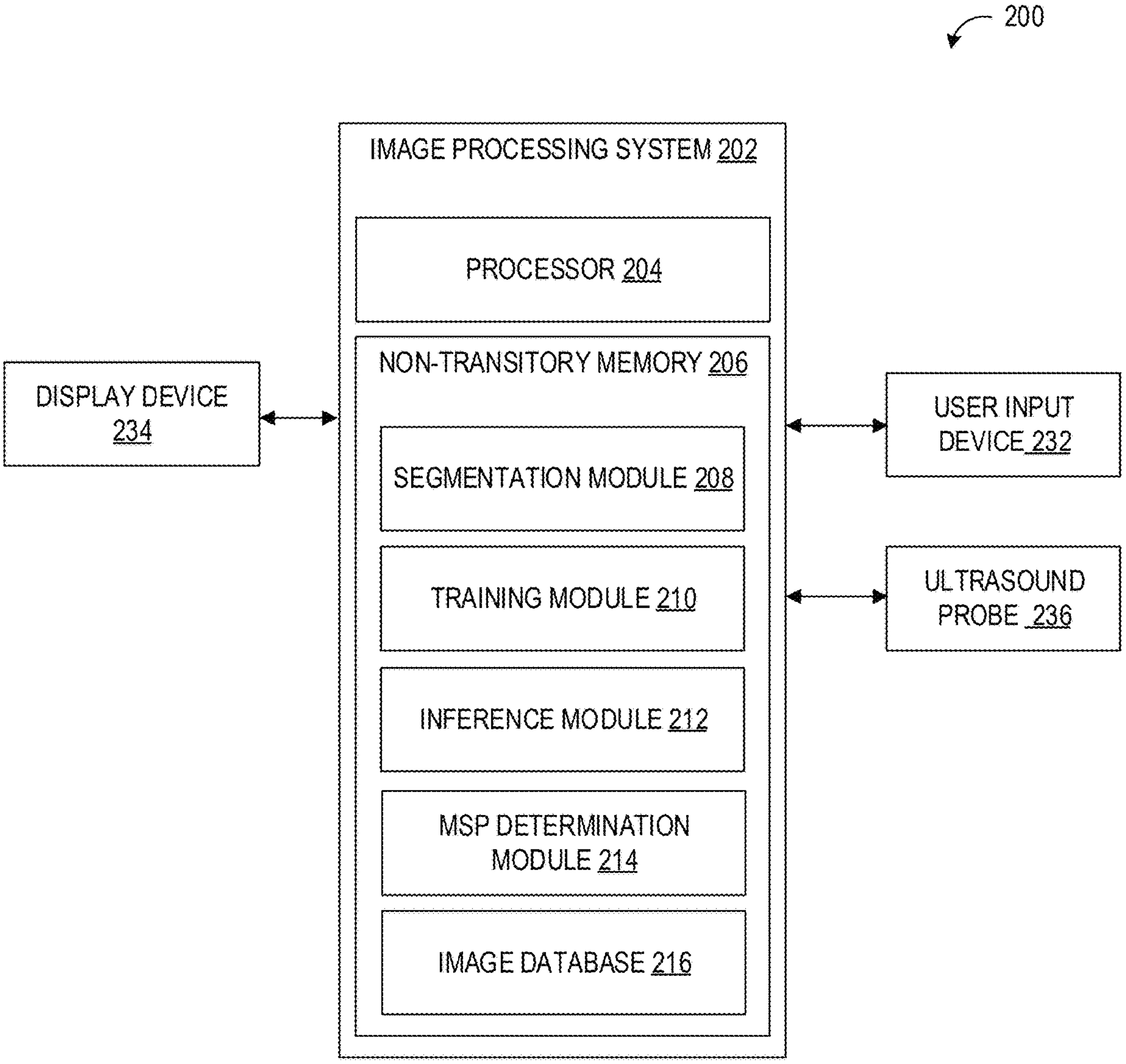
FIG. 2 is a schematic diagram illustrating a system for generating ultrasound images, according to an exemplary embodiment.
Figure 3:
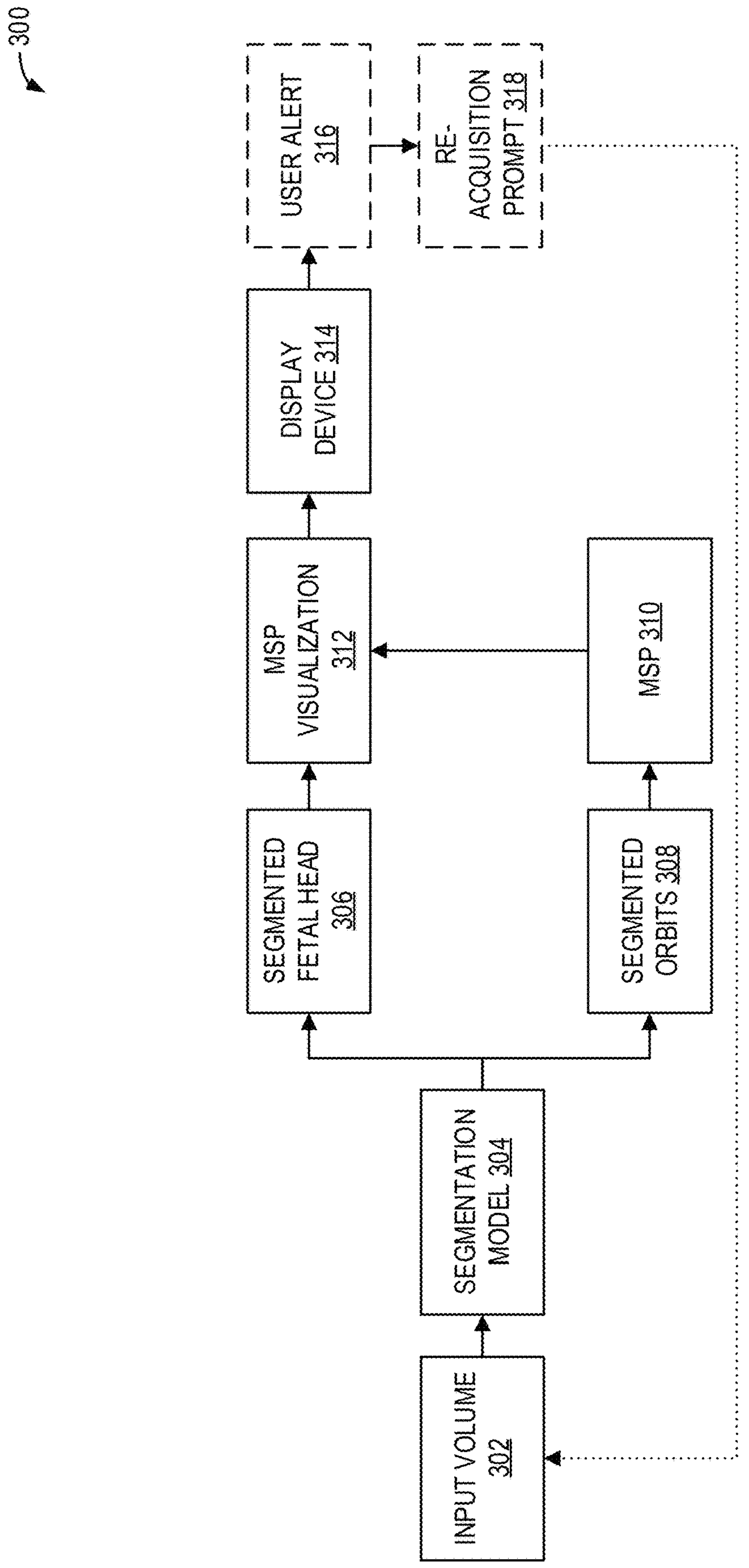
FIG. 3 is an example process for identifying a mid-sagittal plane (MSP) of a fetal head of a subject and providing feedback to a user.
Figure 4:
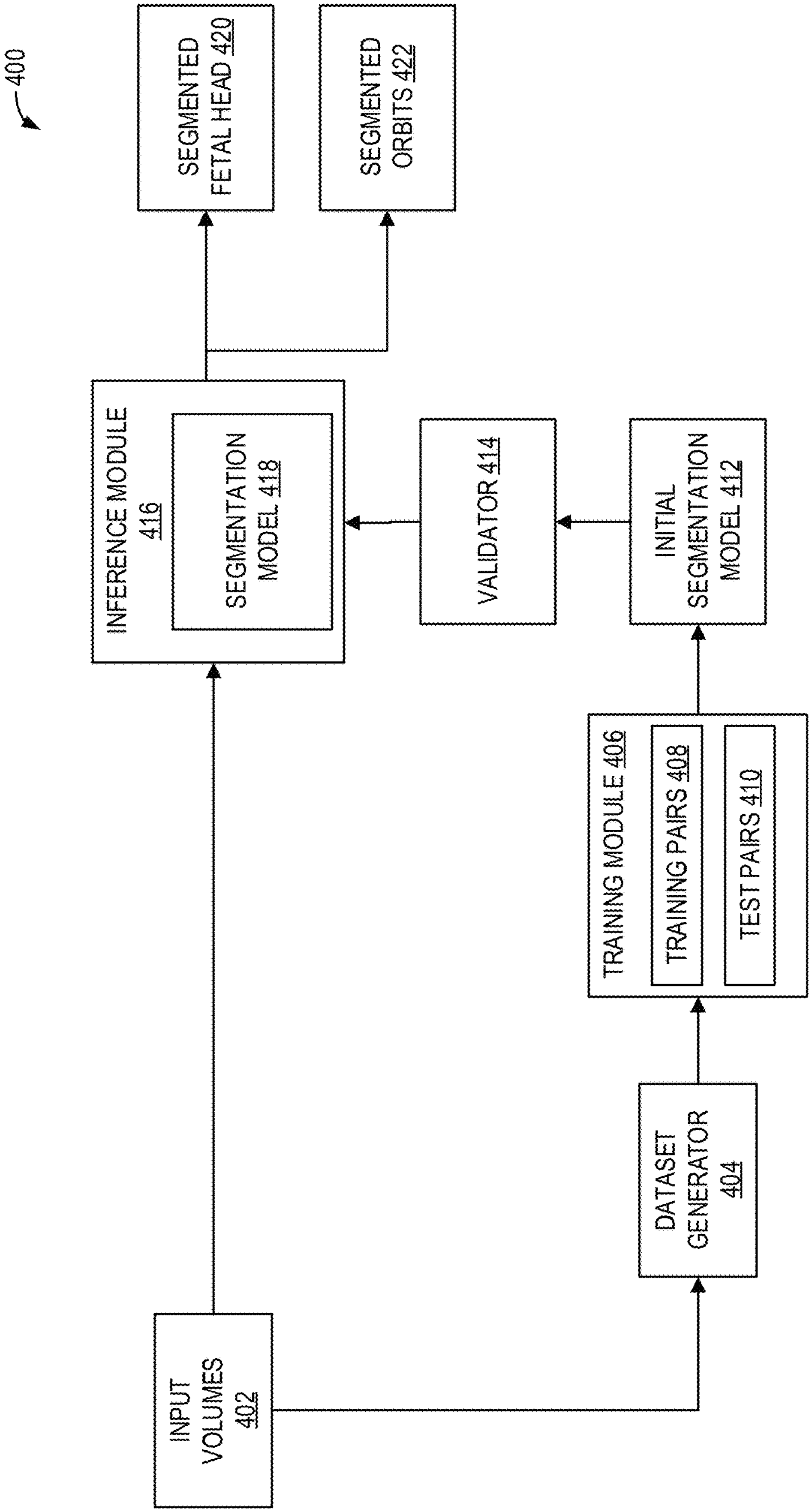
FIG. 4 is an example process for training a segmentation model to identify a fetal head and orbits.
Figure 5:
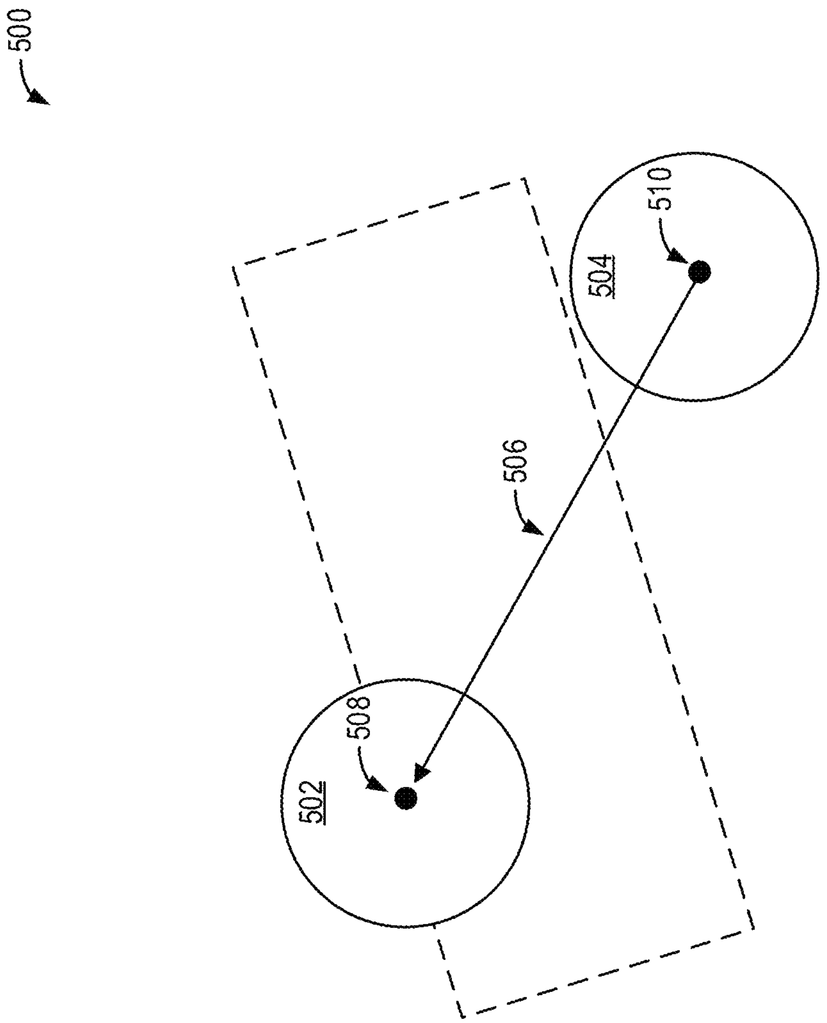
FIG. 5 is an example image of a mid-sagittal plane (MSP) passing between orbits.
Figure 6:
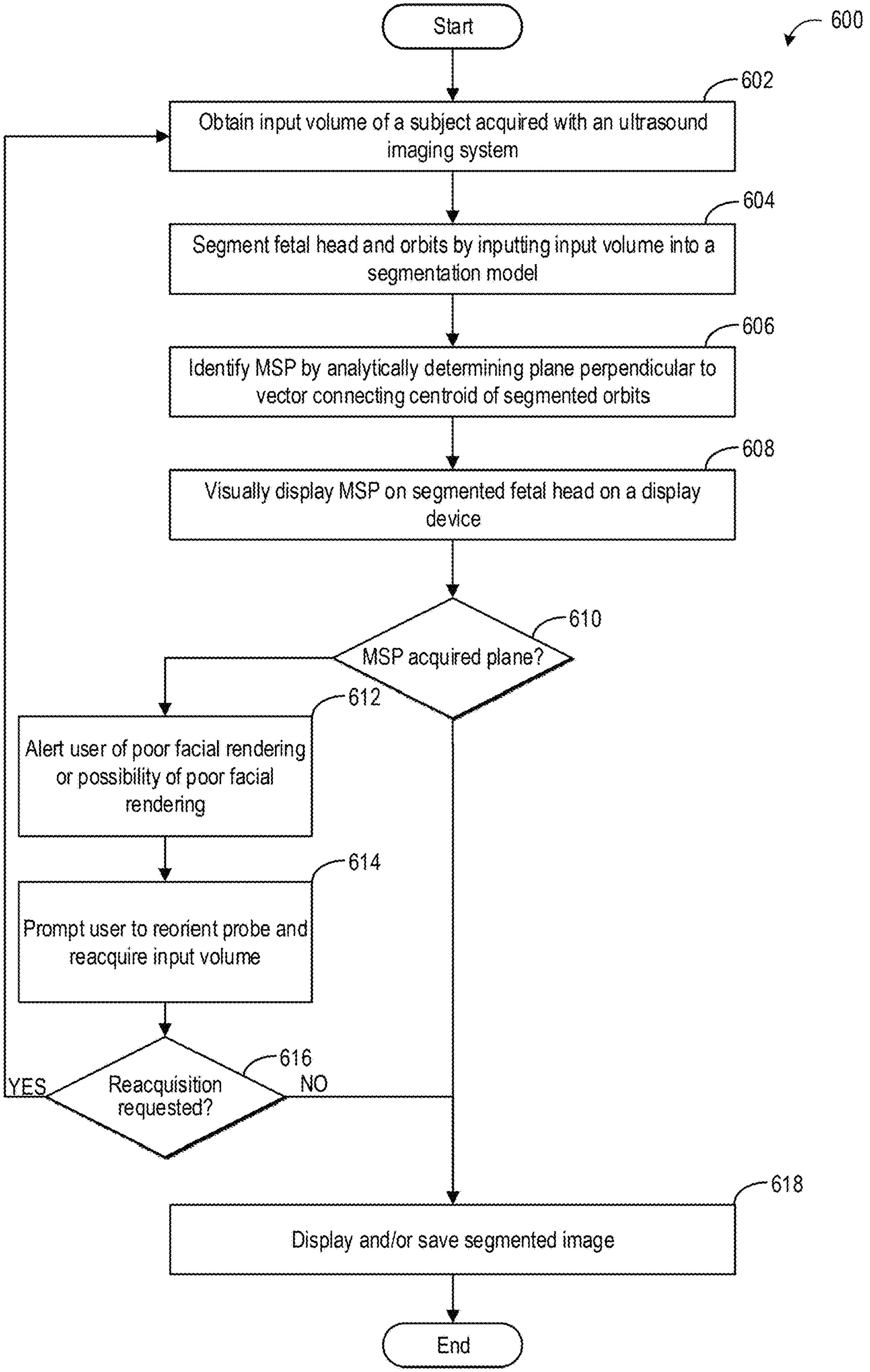
FIG. 6 is a flow chart illustrating a method for identifying a mid-sagittal plane (MSP) of a fetal head of a subject and providing feedback to a user.
Figure 7:
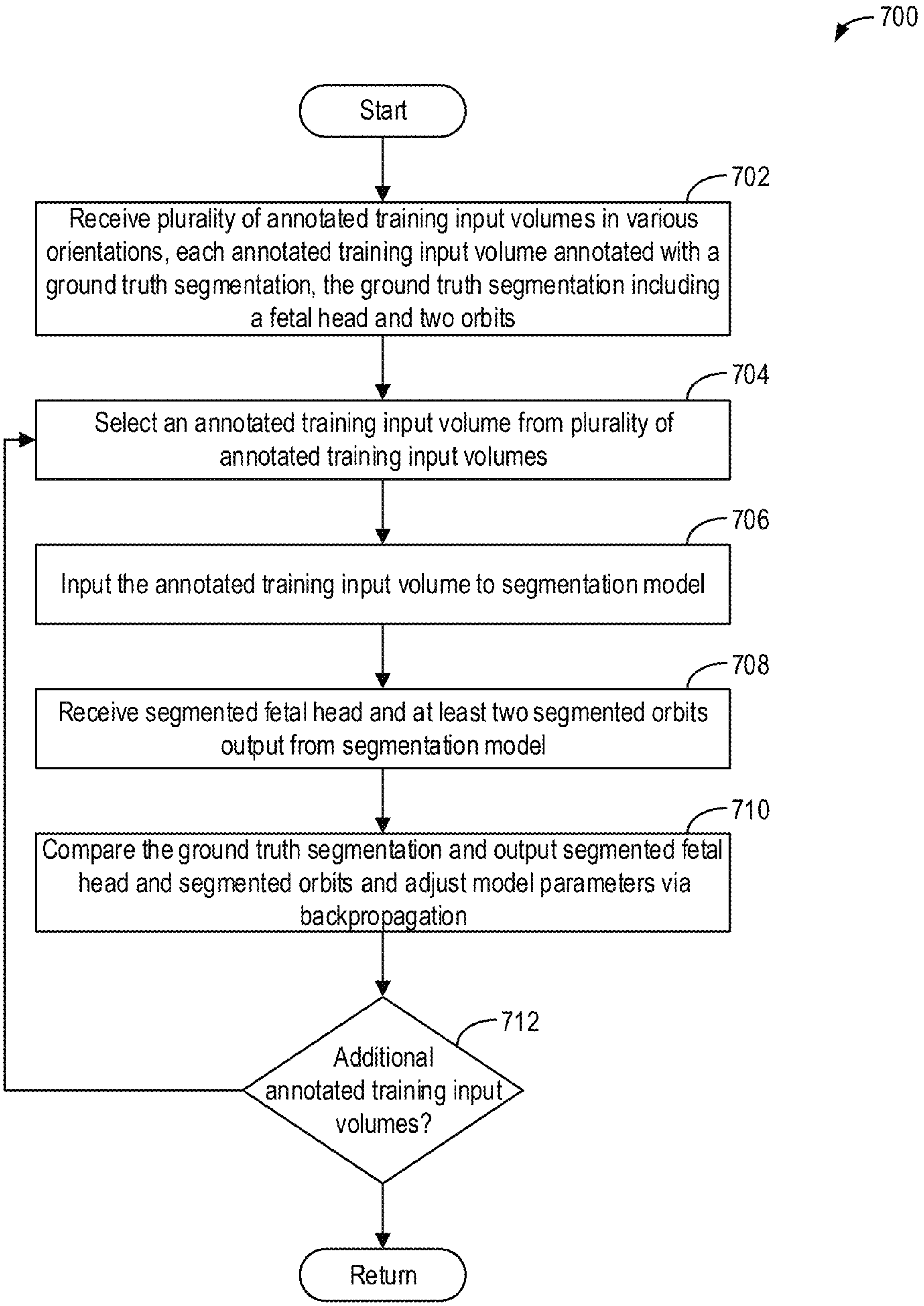
FIG. 7 is a flow chart illustrating a method for training a segmentation model to identify a fetal head and orbits.
Figure 9:
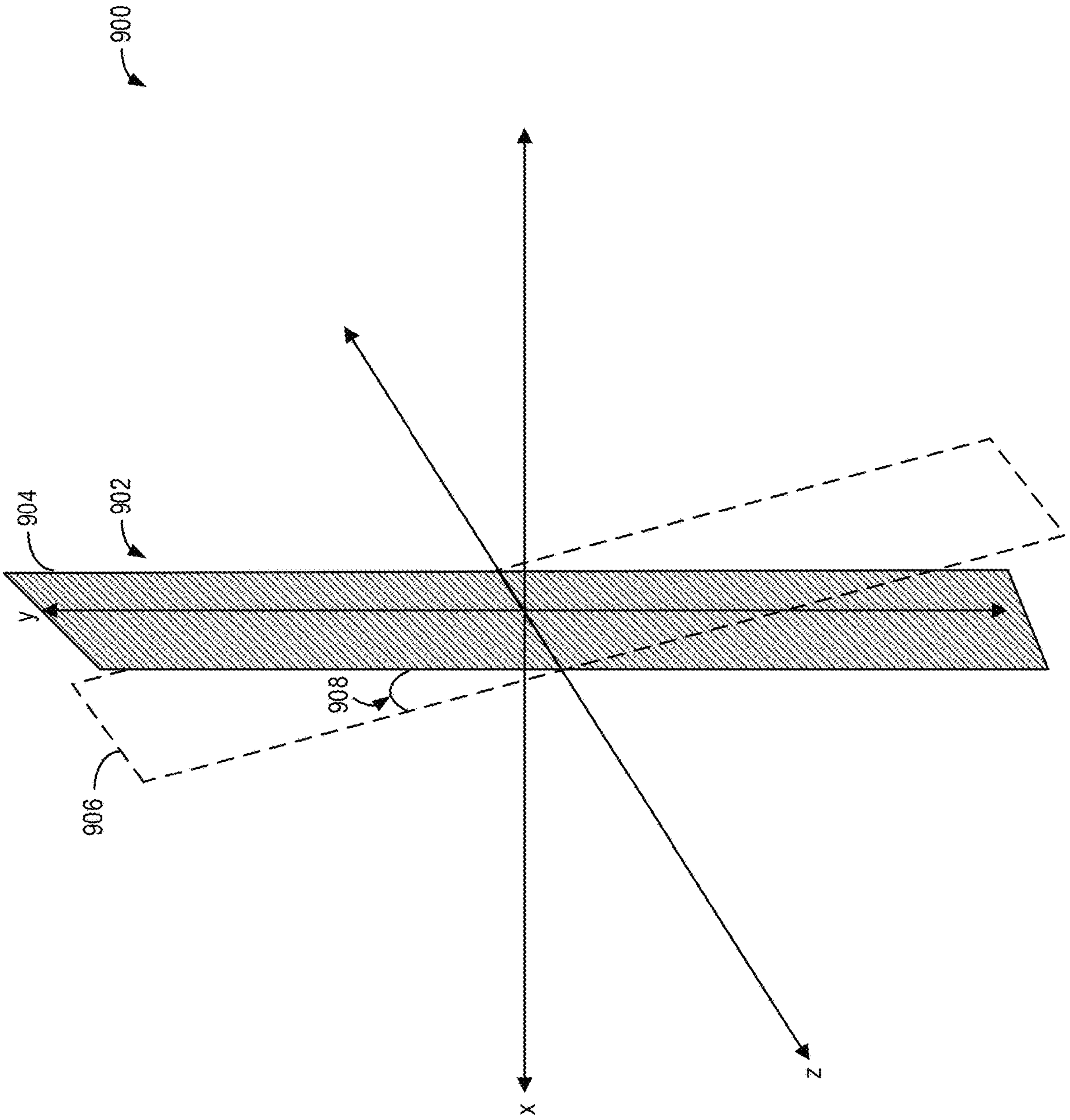
FIG. 9 is a first example image of a mid-sagittal plane (MSP) relative to a canonical plane.
Figure 10:
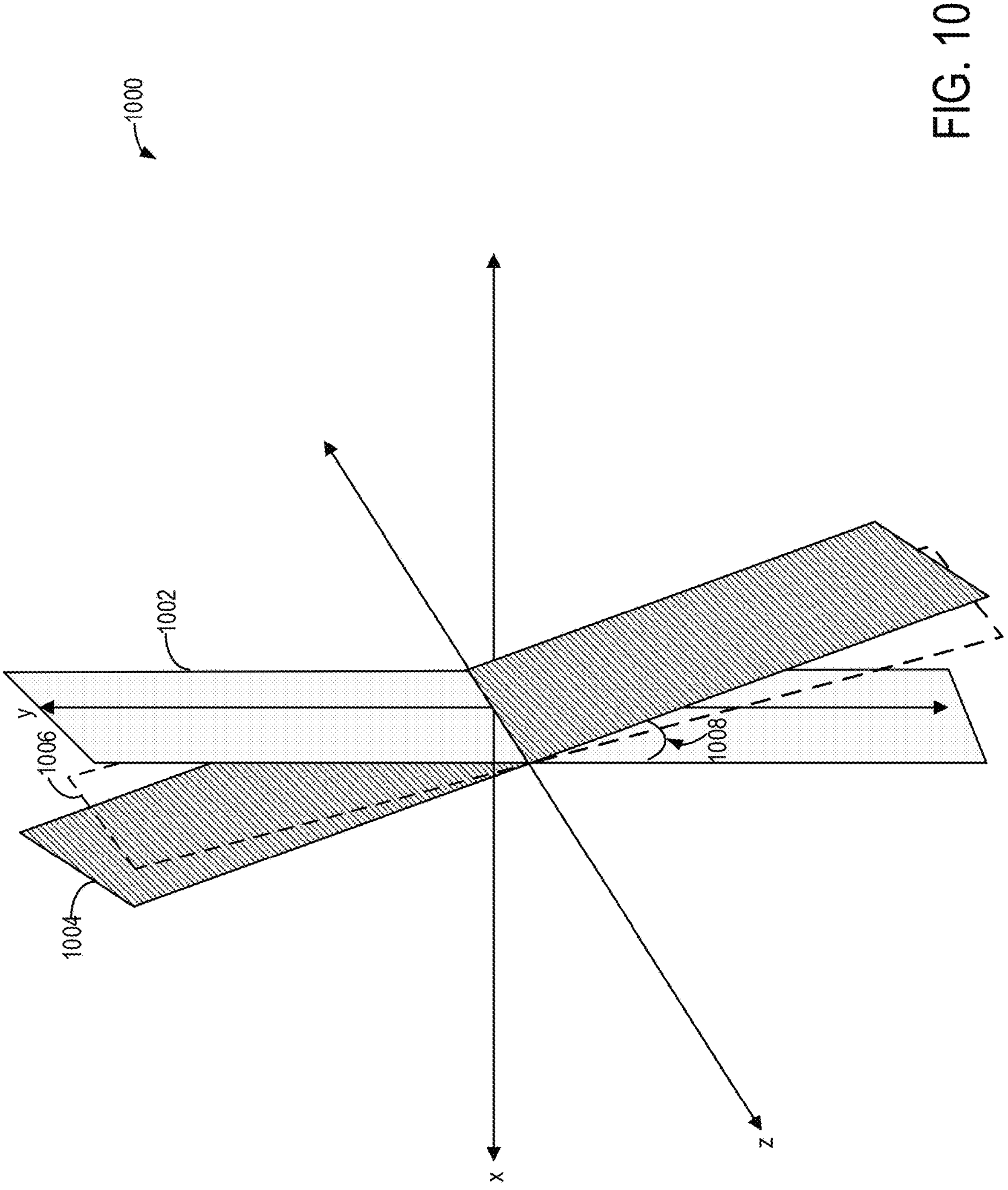
FIG. 10 is a second example image of a mid-sagittal plane (MSP) relative to a canonical plane.
Figure 11:
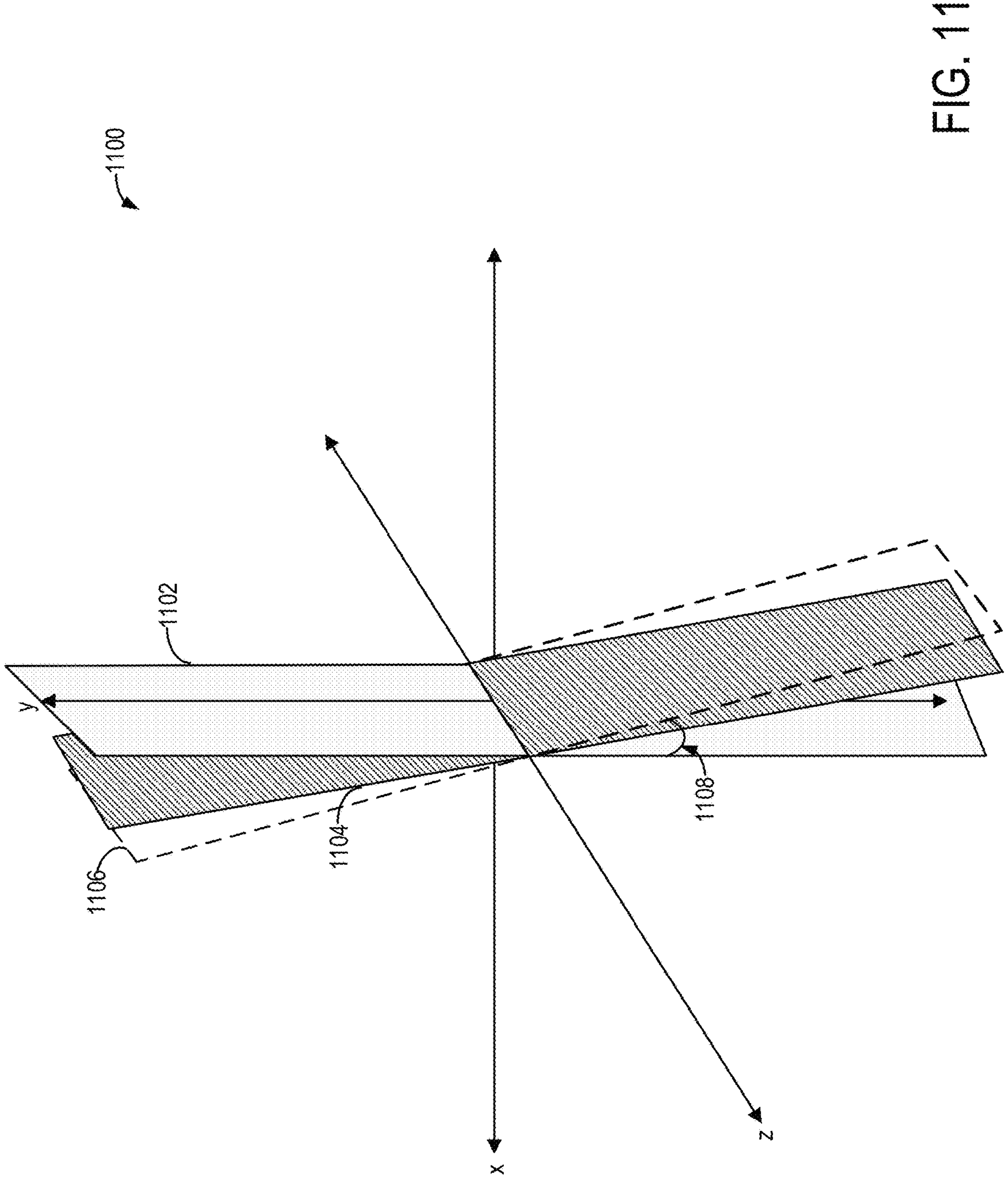
FIG. 11 is a third example image of mid-sagittal plane (MSP) relative to a canonical plane.

An example ultrasound system including an ultrasound probe, a display device, and an image processing system are shown in FIG. 1. Via the ultrasound probe, ultrasound images may be acquired and displayed on the display device. An image processing system, as shown in FIG. 2, includes a segmentation module in non-transitory memory, which may include code that when executed, segments an input volume acquired with an ultrasound imaging system. FIG. 3 shows an example process for identifying the mid-sagittal plane. FIG. 4 shows an example process for training a segmentation model to identify a fetal head and orbits. An example image depicting a mid-sagittal plane positioned between orbits is shown in FIG. 5. FIG. 6 illustrates a method for identifying a mid-sagittal plane (MSP) based on output from a segmentation model and providing feedback in response to the MSP being an oblique plane. FIG. 7 illustrates a method for training a segmentation model to identify a fetal head and orbits of a subject. FIGS. 9-11 show example images of a mid-sagittal plane (MSP) relative to a canonical plane. FIGS. 12-15 show example images of a mid-sagittal plane while a fetal head is in various orientations.

Referring now to FIG. 1, a schematic diagram of an ultrasound imaging system 100 in accordance with an embodiment of the disclosure is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). The probe 106 may be a one-dimensional transducer array probe, or the probe 106 may be a two-dimensional matrix transducer array probe. As explained further below, the transducer elements 104 may be comprised of a piezoelectric material. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. Additionally, transducer element 104 may produce one or more ultrasonic pulses to form one or more transmit beams in accordance with the received echoes.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. In one embodiment, data acquired via ultrasound imaging system 100 may be used to train a machine learning model. A user interface 115 may be used to control operation of the ultrasound imaging system 100, including to control the input of patient data (e.g., patient clinical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and/or a graphical user interface displayed on a display device 118.

The ultrasound imaging system 100 also includes a processor 116 to control the transmit beamformer 101, the transmitter 102, the receiver 108, and the receive beamformer 110. The processor 116 is in electronic communication (e.g., communicatively connected) with the probe 106. For purposes of this disclosure, the term "electronic communication" may be defined to include both wired and wireless communications.

The processor 116 may control the probe 106 to acquire data according to instructions stored on a memory of the processor, and/or memory 120. The processor 116 may control which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment, the demodulation can be carried out earlier in the processing chain.

The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time frame-rate of 7-20 frames/sec. The ultrasound imaging system 100 may acquire 2D data of one or more planes at a significantly faster rate. However, it should be understood that the real-time frame-rate may be dependent on a length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec.

The data may be stored temporarily in a buffer (not shown) during a scanning session and processed in less than real-time in a live or off-line operation. In some embodiments, multiple processors (not shown) may be included to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. It should be appreciated that other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

In various embodiments of the present disclosure, data may be processed in different mode-related modules by the processor 116 (e.g., B-mode, Color Doppler, M-mode, Color M-mode, spectral Doppler, Elastography, TVI, strain, strain rate, and the like) to form spatio-temporal 2D, 3D, or 4D data (e.g., where time is included as one dimension). For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present disclosure, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing an ultrasound scan, a two-dimensional block of data comprising scan lines and their samples is generated for each row of transducers comprised by the ultrasound probe (e.g., one block of data for a 1D probe, or n blocks of data for a 2D probe with n rows of transducers). After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (e.g., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

Ultrasound data acquired by ultrasound imaging system 100 may be further processed at various stages before, during, or after image formation. In some embodiments, as described in greater detail below, ultrasound data produced by ultrasound imaging system 100 may be transmitted to an image processing system, such as the image processing system described below in reference to FIG. 2, where the ultrasound data may be processed by one or more data-driven models. For example, a neural network model may be trained using ultrasound images and corresponding ground truth images to segment an input volume of a region of interest (ROI) generated from ultrasound data. More specifically, the ROI may be a fetal head. The segmentation output may be used to identify a mid-sagittal plane (MSP) of the fetal head. As used herein, ground truth output refers to an expected or "correct" output based on a given input into a machine learning model.

Although described herein as separate systems, it will be appreciated that in some embodiments, ultrasound imaging system 100 includes an image processing system. In other embodiments, ultrasound imaging system 100 and the image processing system may comprise separate devices. In some embodiments, images produced by ultrasound imaging system 100 may be used as a training dataset for training one or more machine learning models, wherein the machine learning models may be used to perform one or more steps of ultrasound image processing, as described below.

Referring to FIG. 2, a block diagram 200 shows an image processing system 202, in accordance with an embodiment. In some embodiments, image processing system 202 is incorporated into the ultrasound imaging system 100. For example, image processing system 202 may be provided in the ultrasound imaging system 100 as the processor 116 and memory 120. In some embodiments, at least a portion of image processing system 202 is disposed at a device (e.g., edge device, server, etc.) communicably coupled to the ultrasound imaging system via wired and/or wireless connections. In some embodiments, at least a portion of image processing system 202 is disposed at a separate device (e.g., a workstation) which can receive images from the ultrasound imaging system or from a storage device which stores the images/data generated by the ultrasound imaging system. Image processing system 202 may be operably/communicatively coupled to a user input device 232 and a display device 234. User input device 232 may comprise the user interface 115 of the ultrasound imaging system 100, while display device 234 may comprise the display device 118 of the ultrasound imaging system 100, at least in some examples. Image processing system 202 may also be operably/communicatively coupled to an ultrasound probe 236.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store a segmentation module 208, a training module 210, an inference module 212, and an MSP determination module 214, and an image database 216. Segmentation module 208 may include at least a deep learning (DL) model, and instructions for implementing the DL model to segment a fetal head and orbits from ultrasound images (e.g., 3D volumes), as described in greater detail below. Segmentation module 208 may include models of various types, including trained and/or untrained neural networks such as CNNs, statistical models, or other models, and may further include various data, or metadata pertaining to the one or more models stored therein.

Non-transitory memory 206 may further store a training module 210, which may comprise instructions for training one or more of the models stored in segmentation module 208. Training module 210 may include instructions that, when executed by processor 204, cause image processing system 202 to conduct one or more of the steps of method 700 for training a neural network model, discussed in more detail below in reference to FIG. 7. In some embodiments, training module 210 may include instructions for implementing one or more gradient descent algorithms, applying one or more loss functions, and/or training routines, for use in adjusting parameters of one or more neural networks of segmentation module 208. Training module 210 may include training datasets for the one or more models of segmentation module 208.

Non-transitory memory 206 stores an inference module 212. Inference module 212 may include instructions for deploying a trained segmentation model as described below with respect to FIG. 6. In particular, inference module 212 may include instructions that, when executed by processor 204, cause image processing system 202 to conduct one or more of the steps of method 700, as described in further detail below.

Non-transitory memory stores an MSP determination module 214. MSP determination module 214 may include instructions for analytically determining a mid-sagittal plane (MSP) perpendicular to a vector between two orbits of a fetal head.

Non-transitory memory 206 further stores image database 216. Image database 216 may include for example, ultrasound images acquired via an ultrasound probe. For example, image database 216 may store images acquired via a handheld ultrasound probe placed on a body of a subject. Image database 216 may include ultrasound images used in one or more training sets for training the one or more neural networks of segmentation module 208.

In some embodiments, non-transitory memory 206 may include components disposed at two or more devices, which may be remotely located and/or configured for coordinated processing. In some embodiments, one or more aspects of non-transitory memory 206 may include remotely-accessible networked storage devices configured in a cloud computing configuration.

User input device 232 may comprise one or more of a touchscreen, a keyboard, a mouse, a trackpad, a motion sensing camera, or other device configured to enable a user to interact with and manipulate data within image processing system 202. In one example, user input device 232 may enable a user to make a selection of an image to use in training a machine learning model, or for further processing using a trained machine learning model.

Display device 234 may include one or more display devices utilizing virtually any type of technology. In some embodiments, display device 234 may comprise a computer monitor, and may display ultrasound images. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view ultrasound images produced by an ultrasound imaging system, and/or interact with various data stored in non-transitory memory 206.

It should be understood that image processing system 202 shown in FIG. 2 is for illustration, not for limitation. Another appropriate image processing system may include more, fewer, or different components.

Turning to FIG. 3, a process 300 for identifying a mid-sagittal plane (MSP) of an input volume 302 is illustrated, which may be performed by the image processing system 202 of FIG. 2. The process 300 may include obtaining an input volume 302. The input volume 302 may be generated from ultrasound data collected during a scan session, and thus each input volume 302 may be mapped from 2D slices generated from processed ultrasound data, the ultrasound data being obtained while a user operates a 3D probe in a 2D mode. The input volume 302 may include a fetal head and orbits of one or more subjects in various orientations relative to three canonical planes (e.g., axial plane, sagittal plane, and coronal plane).

The process 300 may include entering the input volume 302 into a segmentation model 304 (which may be a non-limiting example of the segmentation model described above with respect to FIG. 2) to segment the input volume into the segmented fetal head 306 and the segmented orbits 308. In some embodiments, the segmentation model 304 may be a deep learning (DL) model. In this way, the segmentation model 304 may output masks for the fetal head and orbits included in the input volume.

The process 300 may include determining a mid-sagittal plane (MSP) 310. The MSP 310 may be analytically determined based on the segmented orbits 308. After determining the MSP 310, the process 300 may include performing an MSP visualization 312 on the segmented fetal head 306, which displays the MSP on the segmented fetal head. The segmented fetal head 306 is oriented relative to one of the three canonical planes. In this way, the visualized MSP may be determined to be an acquired plane or an oblique/reconstructed plane. The MSP visualization 312 may be displayed on a display device 314. In response to the MSP being the oblique plane, the process 300 may include outputting a user alert 316 on the display device 314 that explains a cause of and/or possibility of poor facial rendering of the fetal head. As one example, the cause or possibility of poor rendering may be due to the MSP being the oblique plane and not the acquired plane. The process 300 may further include outputting a re-acquisition prompt 318 on the display device 314 that suggests that a user re-acquires the input volume 302 since the current input volume may result in an image with poor facial rendering of the fetal head. In this way, visualization of the fetal face of the subject may be increased without storing ultrasound data that generates unsuitable 3D volumes with poor facial rendering and does not enable a medical professional to monitor development of the fetal head.

Turning to FIG. 4, a process 400 for training a segmentation model 418 is illustrated. The segmentation model 418 may be trained to identify segmentations included in images acquired with an ultrasound imaging system, such as ultrasound imaging system 100 of FIG. 1, in accordance with one or more operations described in greater detail below in reference to FIG. 7. The process 400 may be implemented by one or more computing systems, such as image processing system 202 of FIG. 2, to train the segmentation model 418 to segment an input volume of a subject into a fetal head and orbits, such as an input volume. Once trained, the segmentation model 418 may be used to segment input volumes of subjects acquired with an ultrasound imaging system (e.g., ultrasound imaging system 100 of FIG. 1), in accordance with one or more operations described in greater detail below in reference to FIGS. 6 and 7.

The process 400 includes obtaining input volumes 402 of one or more subjects. For example, ultrasound data of a fetal head may be obtained of each of the one or more subjects during a scanning session wherein a user (e.g., a sonographer) adjusts a position of a 3D probe to identify a mid-sagittal plane (MSP) of the fetal head. While the 3D probe is stationary and operates in a 2D mode, the user acquires ultrasound data, which is processed to generate 2D slices. The 2D slices are mapped to a 3D volume, which may be used as input volumes 402. The input volumes 402 may include one or subjects in various orientations relative to canonical planes wherein each canonical plane is perpendicular to the other canonical planes.

As one example, in a first input volume of input volumes 402, the MSP of the first input volume may be aligned with one of the canonical planes. In another example, in a second input volume of input volumes 402, the MSP of the second input volume may be aligned with a different canonical plane than the first input volume. In a further example, in a third input volume of input volumes 402, the MSP of the third input volume may be an oblique plane wherein the oblique plane is offset from one of the first canonical planes by an angle (e.g., 30°). In other embodiments wherein the MSP is an oblique plane, the MSP may be offset from each of the canonical planes by pre-determined angles. To illustrate, the MSP may be offset from a first canonical plane by 15°, a second canonical plane by 25°, and a third canonical plane by 17°.

The process 400 includes generating a plurality of training pairs of data using a dataset generator 404. The plurality of training pairs of data may be stored in a training module 406. The training module 406 may be the same as or similar to the training module 210 of image processing system 202 of FIG. 2. The plurality of training pairs of data may be divided into training pairs 408 and test pairs 410. Each training pair of training pairs 408 and test pairs 410 may include an annotated input volume and a ground truth segmentation, the ground truth segmentation including a fetal head and orbits.

Once each pair is generated, each pair may be assigned to either the training pairs 408 or the test pairs 410. In an embodiment, the pair may be assigned to either the training pairs 408 or the test pairs 410 randomly in a pre-established proportion (e.g., 90%/10% training/test, or 85%/15% training/test). It should be appreciated that the examples provided herein are for illustrative purposes, and pairs may be assigned to the training pairs 408 dataset or the test pairs 410 dataset via a different procedure and/or in a different proportion without departing from the scope of this disclosure.

A number of training pairs 408 and test pairs 410 may be selected to ensure that sufficient training data is available to prevent overfitting, whereby an initial segmentation model 412 learns to map features specific to samples of the training set that are not present in the test set. The process 400 includes training the initial segmentation model 412 on the training pairs 408. The process 400 may include a validator 414 that validates the performance of the initial segmentation model 412 (as the initial model is trained) against the test pairs 410. The validator 414 may take as input a trained or partially trained model (e.g., the initial segmentation model 412, but after training and update of the model has occurred) and a dataset of test pairs 410, and may output an assessment of the performance of the trained or partially trained segmentation model on the dataset of test pairs 410.

Thus, the initial segmentation model 412 is trained on a training pair wherein the training pair includes the annotated input volume and the ground truth segmentation. Additional training pairs may be used to train the initial segmentation model 412, each including annotated input volumes in various orientations relative to canonical planes and the ground truth segmentations. It is to be appreciated that different pairs may be of different subjects. A respective annotation of each annotated input volume indicates a location of the fetal head and orbits in each annotated input volume. The respective annotation may be considered as the ground truth segmentation(s). The ground truths segmentations may be compared with segmentations output from the initial segmentation model to calculate a loss function that is used to adjust model parameters of the initial segmentation model.

Once the validator 414 determines that the segmentation model is sufficiently trained, the segmentation model may be stored in the segmentation module 208 and the inference module 416, which may be an embodiment of inference module 212 of FIG. 2. The segmentation model 418, when deployed, may segment a fetal head and orbits included in input volumes acquired with an ultrasound imaging system. Newly-acquired input volumes may be entered as input to the segmentation model 418 to output a segmented fetal head 420 and segmented orbits 422. The segmented orbits 422 may be used to determine the mid-sagittal plane according to the embodiments described herein.

FIG. 5 shows a mid-sagittal plane (MSP) 500 analytically determined based on two orbits, such as a first orbit 502 and a second orbit 504. In some embodiments, the first orbit 502 and the second orbit 504 may be output from a segmentation model, which may be an embodiment of the segmentation model 304 of FIG. 3 and segmentation model 418 of FIG. 4. The MSP 500 is a plane perpendicular to a vector 506 that connects the centroids of the first orbit 502 and the second orbit 504. The first orbit 502 and second orbit 504 may be segmented orbits output from the segmentation model. The plane is equidistant to the first orbit 502 and the second orbit 504 In particular, the centroid of the first orbit 502 may be at a first point 508 whereas the centroid of the second orbit 504 may be at a second point 510. The vector 506 may be analytically determined by subtracting the second point 510 from the first point. The MSP 500 may be determined analytically with the vector 506 by using a vector equation comprising a point on the plane and the vector connecting the centroids of the first orbit 502 and the second orbit 504, the vector being an embodiment of the vector 506. In some embodiments, the point may be the mid-point of the first orbit 502 and the second orbit 504.

FIG. 6 is a flowchart illustrating a method 600 for identifying a mid-sagittal plane (MSP) of an input volume and providing feedback and recommendations to a user based on whether the MSP is an oblique/reconstructed plane, according to an embodiment of the disclosure. Method 600 may be carried out according to instructions stored in non-transitory memory and executed by one or more processors of a computing device, such as the image processing system 202 of FIG. 2.

At 602, the method 600 includes obtaining an input volume of a fetal acquired with an ultrasound imaging system. The input volume may be a three-dimensional (3D) image mapped from two-dimensional (2D) slices generated from ultrasound data collected during a scanning session of a fetal head, wherein the ultrasound data is acquired with a 3D probe operating in a 2D mode. In some embodiments, the ultrasound data may be obtained with the ultrasound imaging system of FIG. 1. During the scanning session, ultrasound data used to generate the input volume is acquired with a stationary ultrasound probe.

At 604, the method 600 includes segmenting a fetal head and orbits by inputting the input volume into a segmentation model. The segmentation model comprises a deep learning model trained with a plurality of training pairs, each training pair including an annotated training input volume and a ground truth segmentation. The segmentation model is trained to output a segmentation mask that identifies a fetal head without clutter, a first orbit, and a second orbit. By entering the input volume as input to the segmentation model, the input volume may be segmented into a segmented fetal head, a first segmented orbit, and a second segmented orbit. The segmentation model may be the segmentation models described with respect to FIGS. 3 and 4, or another suitable segmentation model configured to segment the input volume into a fetal head and two orbits. The segmentation model may output a segmentation mask that identifies pixels in the input volume that correspond to each of the fetal head, the first orbit, and the second orbit.

In some examples, the segmentation model may identify more than two orbits, where the two or more orbits are generally located in two different locations. However, since a fetal head includes two orbits, the segmentation model may group potential orbits that are in close proximity together. Or rather, all segmented orbits near a first region may be combined to form a first segmented orbit and all segmented orbits near a second region may be combined to form a second segmented orbit in response to the segmentation model identifying more than two segmented orbits.

To elaborate, a first segmented orbit may be a first region wherein the first region includes all the identified orbits located near the first region. As such, the first segmented orbit located in the first region is a combination of pixels corresponding to more than one segmented orbit located in the first region. Similarly, a second segmented orbit may be a second region wherein the second region includes all the identified orbits located near the second region. In this way, the second segmented orbit located in the first region is a combination of pixels corresponding to more than one segmented located in the second region.

Figure 8:
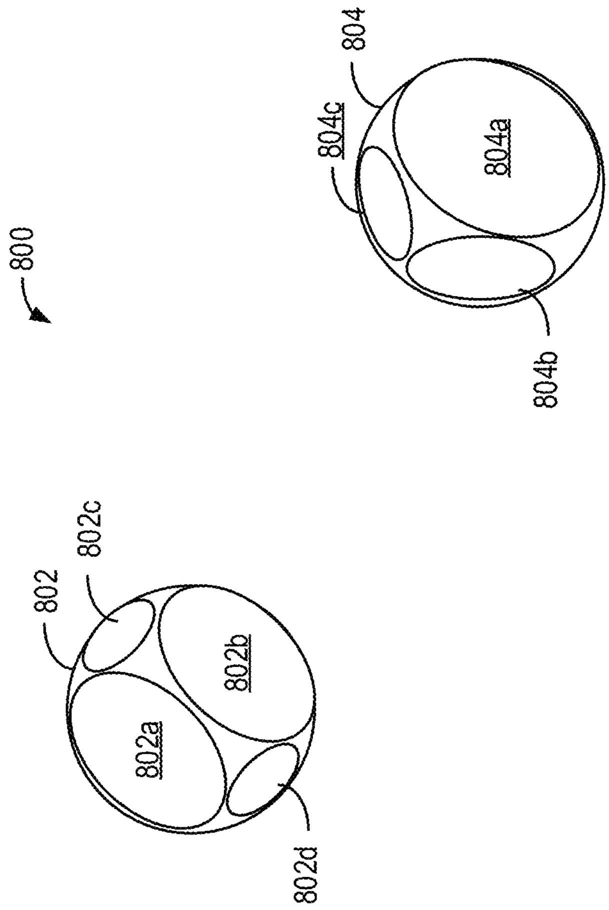
FIG. 8 is an example image of a first segmented orbit and a second segmented orbit constructed from more than two identified orbits.

An example of a pair 800 of segmented orbits is shown in FIG. 8. As shown, the pair 800 of segmented orbits includes a first segmented orbit 802 in a first region and a second segmented orbit 804 in a second region. A segmentation model may have originally identified four potential orbits near the first region, such as a first potential orbit 802*a*, a second potential orbit 802*b*, a third potential orbit 802*c*, and a fourth potential orbit 802*d*. Since a fetal head includes only two orbits, the first region that includes the four potential orbits may be considered the first segmented orbit 802. Similarly, the segmentation model may have originally identified three orbits, such as a fifth potential orbit 804*a*, a sixth potential orbit 804*b*, and a seventh potential orbit 804*c*. In this way, the second region that includes the three potential orbits may be considered the second segmented orbit 804.

In other examples, the segmentation model may identify more or less potential orbits than described above. Regardless of the number of identified potential orbits, potential orbit(s) concentrated in a specific location are combined, forming a single segmented orbit. However, in order to determine the MSP, at least two orbits are identified by the segmentation model. Otherwise, the MSP may not be analytically determined according to the embodiments described below. Instead, the user may be prompted to reorient the ultrasound probe and reacquire the input volume in response to the segmentation model outputting one segmented orbit.

Generating the segmentation mask with the segmentation model may include identifying sets of pixels corresponding to anatomical regions, and each set of pixels may correspond to one anatomical region. For example, a first set of pixels may correspond to a first anatomical region, which may be the fetal head, a second set of pixels may correspond to a second anatomical region, which may be the first orbit, and a third set of pixels may correspond to a third anatomical region, which may be the second orbit. The segmentation mask may be generated based on the sets of pixels corresponding to the different anatomical regions. The segmentation mask may include a pixel value for each pixel of the image that indicates the anatomical in the input volume, e.g., a value of 0 indicates no identified anatomical region, a value of 1 indicates the fetal head, a value of 2 indicates the first orbit, and so forth. However, other mechanisms for identifying the anatomical regions in the segmentation mask are possible without departing from the scope of this disclosure.

At 606, the method 600 includes identifying MSP by analytically determining a plane perpendicular to vectors connecting a centroid of the segmented orbits. As described above with respect to FIG. 5, the plane may be determined analytically with a vector equation wherein the vector equation comprises a point on the plane and the vector connecting the centroids of the first segmented orbit and the second segmented orbit.

At 608, the method 600 includes visually displaying the MSP on the segmented fetal head on a display device. The display device may be an embodiment of display device 234 of FIG. 2. In this way, the orientation of the fetal head and the MSP relative to three canonical planes (e.g., axial, coronal, and sagittal planes) may be visualized. FIGS. 12-15 show example images wherein an MSP is visualized on a segmented fetal head.

At 610, the method 600 includes determining whether the MSP is an acquired plane. The MSP may be considered an acquired plane when the MSP is either coplanar or relatively coplanar with one of the three canonical planes described. More specifically, the MSP may be considered the acquired plane when the MSP is at an angle of inclination of the MSP relative to one of the three canonical planes is within an angle threshold. The angle threshold may range from 0° to a maximum accepted angle.

Determining whether the MSP is not an acquired plane may include determining the angle of inclination of the MSP relative to one of the three canonical planes and determining whether the angle of inclination of the MSP is within an angle threshold by comparing the angle of inclination with a maximum accepted angle of inclination. In some embodiments, instructions stored in a computing device, such as the image processing system 202 of FIG. 2, may analytically determine the angle of inclination of the MSP relative to each of the three canonical plane. In particular, the angle of inclination of the MSP is determined analytically based on an equation comprising a first normal vector of the MSP and a second normal vector of the respective canonical plane, the first normal vector being the vector between the at least two segmented orbits. In other embodiments, a user may manually determine whether the angle of inclination of the MSP is within the angle threshold upon visual inspection of the MSP relative to the canonical plane. Examples of various angles of inclination of the MSP relative to one of the three canonical planes is shown in FIGS. 9-11.

In FIGS. 9-11, coordinate systems 900, 1000, and 1100 are shown wherein a first mid-sagittal plane (MSP) 904 in a first orientation, a second MSP 1004 in a second orientation, and a third MSP in a third orientation are visualized on a segmented fetal head (not shown). The coordinate systems 900, 1000, and 1100 include an x-axis, a y-axis, and a z-axis. The three canonical planes may be an x-y plane, an x-z plane, and an y-z plane of the coordinate systems 900, 1000, and 1100. The three canonical planes are related to the probe axes. Generally, the acquired plane is either co-planar with an azimuthal plane or at an angle of inclination relative to the azimuthal plane, the angle of inclination being within an angle threshold. For simplicity, the first MSP 904, the second MSP 1004, and the third MSP 1104 may be considered acquired planes when the respective MSP is either co-planar with the y-z plane (canonical plane) or an angle of inclination of the respective MSP relative to the y-z plane (e.g., canonical plane) is within an angle threshold.

Turning to FIG. 9, the coordinate system 900 includes the first MSP 904, a canonical plane 902 (not visible), and a theoretical MSP 906. The theoretical MSP 906 has an angle of inclination 908 relative to canonical plane 902. In some embodiments, maximum angle of inclination 908 may range from 10°-15°. For the purposes of the example, the angle of inclination 908 of the theoretical MSP is 15°. The theoretical MSP 906 may be considered the MSP with the largest accepted angle of inclination 908. In other words, the theoretical MSP 906 has an angle of inclination 908 within the angle threshold for the MSP to be classified as an acquired plane. Since the first MSP 904 is co-planar with the canonical plane 902 and the angle of inclination of the first MSP 904 is less than the angle of inclination 908 of the theoretical MSP, the first MSP 904 may be considered the acquired plane and not an oblique/reconstructed plane.

As shown in FIG. 10, the coordinate system 1000 includes the second MSP 1004 with an angle of inclination 1008 relative to the canonical plane 1002, a canonical plane 1002, and a theoretical MSP 1006. The second MSP 1004 is not co-planar with the canonical plane 1002. As an example, the angle of inclination 1008 may be 20°. Similar to the theoretical MSP 906 of FIG. 9, the theoretical MSP 1006 has an angle of inclination relative to the canonical plane 1002, which may also be 15°, and may be considered the MSP with the largest accepted angle of inclination (e.g., within the angle threshold). Since the angle of inclination 1008 of the second MSP 1004 exceeds the angle of inclination of the theoretical MSP 1006 and is not within the accepted angle threshold, the second MSP is considered an oblique/reconstructed plane.

As illustrated in FIG. 11, the coordinate system 1100 includes the third MSP 1104 with an angle of inclination 1108 relative to the canonical plane 1102, a canonical plane 1102, and a theoretical MSP 1106. The third MSP 1104 is not co-planar with the canonical plane 1102. As an example, the angle of inclination 1108 may be 10°. Similar to the theoretical MSPs described in FIGS. 9 and 10, the theoretical MSP 1106 has an angle of inclination relative to the canonical plane 1102, which may also be 15°, and may be considered the MSP with the largest accepted angle of inclination (e.g., within the angle threshold). Since the angle of inclination 1108 of the third MSP 1104 does not exceed the angle of inclination of the theoretical MSP 1006 and is within the accepted angle threshold, the third MSP is considered an oblique/reconstructed plane.

In response to determining that the MSP is an oblique plane and not the acquired plane image, the method 600 includes alerting a user of poor facial rendering or a possibility of poor facial rendering at 612. The user may be alerted that the MSP is not suitable for facial rendering and that ultrasound images generated with the current input volume may exhibit diminished image quality. In particular, a message may be displayed on the display device, such as the display device 234 of FIG. 2, to alert the user of the poor facial rendering or the potential for poor facial rendering of the fetal head.

At 614, the method 600 includes prompting the user to reorient the probe and reacquire the input volume. More specifically, a message that prompts the user to reorient the probe and reacquire the input volume may be displayed on the display device.

At 616, the method 600 includes determining whether reacquisition of the input volume is requested. In some embodiments, user input may be received at a user interface of the display device. More specifically, the user input may be received at a user input device, such as user input device 232. In this way, the image processing system, which may be an embodiment of the image processing system 202 of FIG. 2, may receive the user input. In some embodiments, the image processing system may initiate a new scanning session to obtain ultrasound data to generate the input volume in response to receiving the user input. In other embodiments, the image processing system may terminate the scanning session and display the current input volume in response to receiving the user input.

In response to receiving user input requesting reacquisition of the input volume, the method 600 includes obtaining the input volume of the subject acquired with an ultrasound imaging system and determining the MSP until the determined MSP of the input volume is an acquired plane or the image processing system receives user input that terminates the scanning session or acquisition process.

At 618, the method 600 includes displaying and/or saving the input volume. The input volume may be displayed using a display device, such as a display device communicatively coupled to an image processing system, which may be the image processing system 202 of FIG. 2. In this way, a medical professional may visually evaluate the content of the input volume and evaluate development of the fetal head based on the content of input volume. By ensuring the MSP is an acquired plane, the medical professional may correctly assess the development of the fetal head more easily since the frequency of poor facial rendering may be reduced and image quality is not diminished. Further, the final transformed image may be stored in memory of the image processing system (e.g., non-transitory memory 206 of FIG. 2) or in an image archive such as a PACS to enable a user or the medical professional to access the input volume at a later time. The method 600 then ends.

Returning to 610, in response to determining that the MSP is the acquired plane, the method 600 includes displaying and/or saving the segmented image at 618. The input volume may be displayed on and saved to the systems previously described to enable a medical professional to assess development of the fetal head. The method 600 then ends.

In some examples, one or more aspects of the method 600 may be executed in response to receiving user input at a user input device and/or executed as part of a scan protocol. In some examples, the input volume may be segmented to identify the MSP as part of the scan protocol. In other examples, the input volume may be segmented to identify the MSP in response to user request, wherein a user requests segmentation of the input volume and MSP determination by interacting with the user input device. For example, the user may specify when the input volumes are to be segmented to identify the MSP. In some examples, the user may initially view the input volume and request, upon viewing the input volume, that the input volume be segmented to identify the MSP in order to determine a strategy for reorienting the ultrasound probe. Thus, in some examples, the input volume may be displayed on a display device prior to segmentation of the input volume and identification of the MSP. However, in other examples, the image may not be displayed on the display device prior to segmentation of the input volume and identification of the MSP.

Further, in other embodiments, one or more aspects of the method 600 may be implemented by identifying the fetal head, the first orbit, and the second orbit with alternative means other than segmentation and a segmentation model. As one example, the first orbit and the second orbit may be identified with localization and detection methods. Once identified, the first orbit and the second orbit may be used to identify the MSP as described above in FIG. 6.

Turning now to FIG. 7, it shows a flow chart illustrating an example method 700 for training a segmentation model to segment an input volume into a fetal head and orbits of the fetal head. Method 700 is described with regard to the systems and components of FIGS. 1-2, though it should be appreciated that the method 700 may be implemented with other systems and components without departing from the scope of the present disclosure. Method 700 may be carried out according to instructions stored in non-transitory memory of a computing device, such as memory 120 of FIG. 1 or non-transitory memory 206 of FIG. 2, and executed by a processor of the computing device, such as processor 116 of FIG. 1 or processor 206 of FIG. 2.

At 702, method 700 includes receiving a plurality of annotated training input volumes in various orientations, each annotated training input volume may be annotated with a ground truth segmentation, the ground truth segmentation including a fetal head and two orbits. For example, the annotated training input volumes may be input volumes of one or more subjects obtained with the ultrasound imaging system of FIG. 1. The various orientations of the input volume include a fetal head being in various positions relative to three canonical planes, each canonical plane being orthogonal to the other canonical planes.

The ground truth segmentations may be expert-generated labels/annotations. For example, one or more experts (e.g., clinicians) may evaluate the training input volumes and generate the ground truth by manually (e.g., via a user input device) labeling/annotating the training input volumes with the ground truth segmentations that indicate, for example, the border(s) of the fetal head and the orbits.

At 704, the method 700 includes selecting an annotated training input volume (e.g., training pair) from the plurality of annotated training input volumes. Instructions configured, stored, and executed in memory by a processor may cause the processor to randomly select one annotated training input volume from the plurality of annotated training images.

The selected training pair may include the first annotated training input volume for the first subject described above. Each training pair includes an annotated training input volume and a ground truth segmentation. A respective annotation of each annotated training input volume indicates a segmentation for the fetal head, the first orbit, and the second orbit in each annotated training input volume. In particular, each annotated training input volume may be annotated with the ground truth segmentation.

At 706, the method 700 includes inputting the annotated training input volume to the segmentation model. Instructions configured, stored, and executed in a training module by one or more processors of the image processing system described above with respect to FIG. 3 may cause the annotated training input volume be entered as input into the segmentation model. The segmentation model may be the initial segmentation model 412 of FIG. 4, prior to training (e.g., the initial segmentation model 412). In some embodiments, the segmentation model may be a deep learning model, such as UNET.

At 708, the method 700 includes receiving the segmented fetal head and at least two segmented orbits output from the segmentation model. The at least two segmented orbits output from the segmentation model may include a first segmented orbit located in a first region and a second segmented orbit located in a second region. In some embodiments, the segmented fetal head, the first segmented orbit, and the second segmented orbit may be identified with a segmentation mask output from the segmentation model. The segmentation mask identifies pixels in the input volume that correspond to each of the segmented fetal head, the first segmented orbit, and the second segmented orbit as described herein.

At 710, the method 700 includes comparing the ground truth segmentation and output segmented fetal and the segmented orbits and adjusting model parameters via back-propagation. In this way, one or more weights, biases, gradients, etc., of the segmentation model may be updated based on one or more losses between the output of the segmentation model and the associated ground truth segmentation. The losses may be determined with a loss function, such as a dice function. In some examples, the segmentation model may be trained to output a classification for each pixel in an input image based on characteristics of the input volume, where the classification indicates whether that pixel belongs to the anatomical ROI or whether that pixel belongs to background (or another suitable classification).

At 712, the method 700 includes determining whether there are additional annotated training input volumes included in the plurality of annotated training input volumes. As explained above, a plurality of training pairs, each training pair including the annotated training input volume and the ground truth segmentation may be used to train the segmentation model. If less than all the training pairs have been selected and used to train the segmentation model (e.g., at least some training images remain), or if the segmentation is otherwise determined to not be fully trained, then there may be additional annotated training input volumes to be entered as input into the segmentation model. In contrast, if it is determined that each triad of training images has been selected and used to train the segmentation model (and no more training images remain), or if the segmentation model is otherwise determined to be fully trained, then there are no additional annotated training input volumes left to be entered as input into the segmentation model.

In response to determining are additional annotated training input images, the method 700 includes selecting the annotated training input volume from the plurality of annotated training input volumes at 704 and continuing to train the segmentation model on the remaining annotated training input images. In response to determining there are no additional annotated training input volumes, the method 700 then ends.

FIGS. 12-15 show additional examples of a mid-sagittal plane (MSP) visualized on a segmented fetal head of a subject, the segmented fetal head being in various orientations relative to a coordinate system that defines the three canonical planes. The coordinate system may be related to the probe axis relative to the body surface. The images shown in FIGS. 12-15 are fetal head volumes of the subject.

Figure 12:
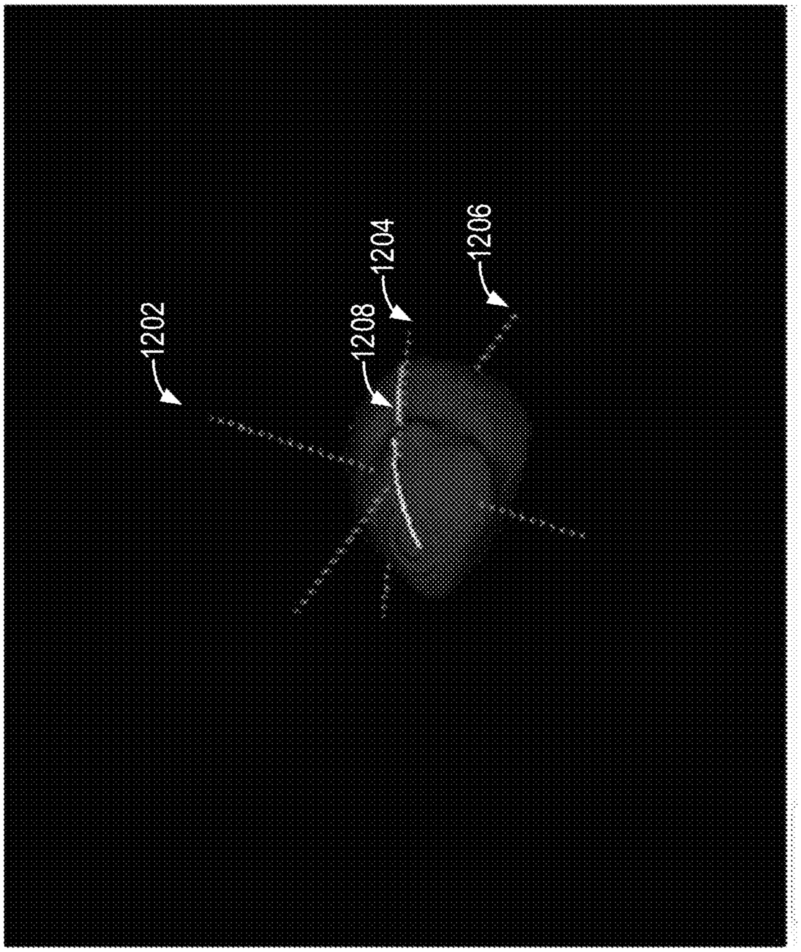
FIG. 12 is an example image of a visualization of a mid-sagittal plane (MSP) while a fetal head is in a first orientation.

FIG. 12 illustrates a first example image 1200 of the fetal head volume in a first orientation generated by the segmentation model using ultrasound data. The first example image 1200 may be a fetal head volume relative to a first axis 1202, which may be a y-axis, a second axis 1204, which may be an x-axis, and a third axis 1206, which may be a z-axis. The three canonical planes may be the coordinate planes (e.g., an x-y plane, an x-z plane, and a y-z plane). The first example image 1200 may include a MSP 1208 visualized on the fetal head volume. By visualizing the MSP 1208 on the fetal head volume, an angle of inclination of the MSP relative to the second axis 1204 may be visualized.

Figure 13:
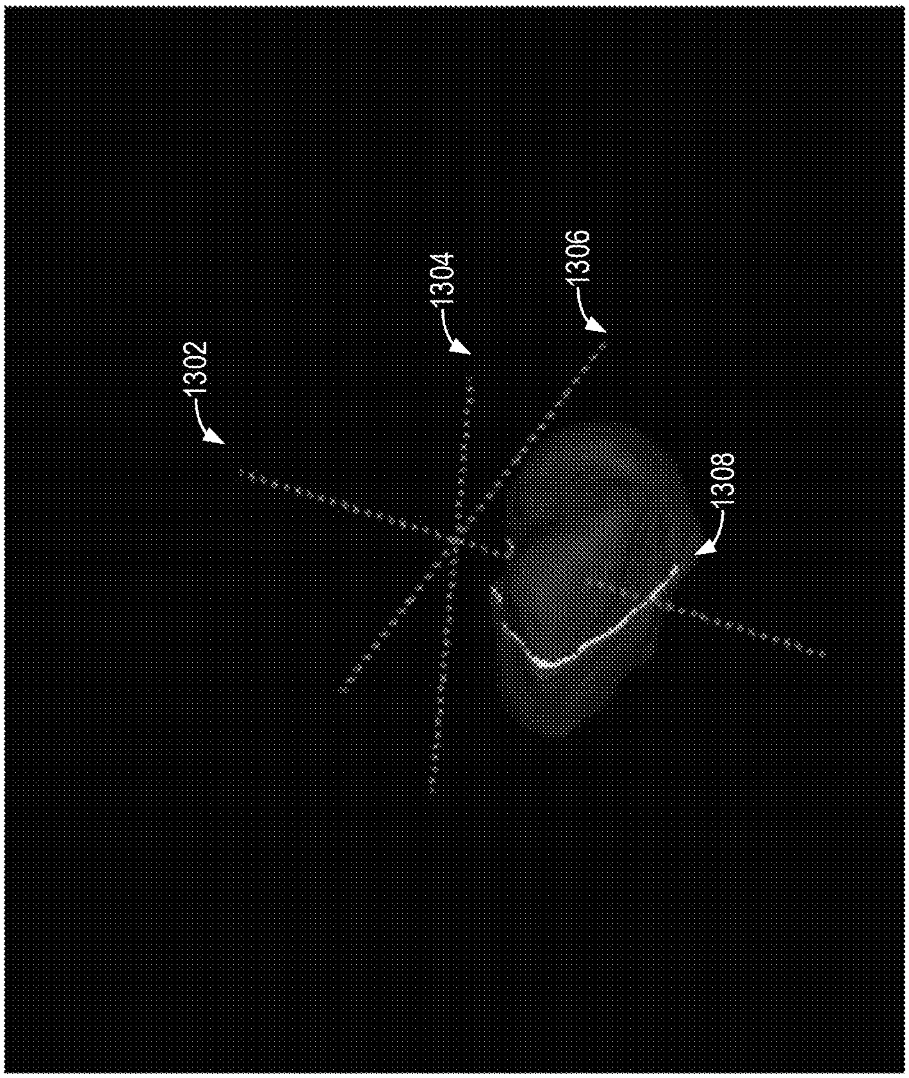
FIG. 13 is an example image of a visualization of a mid-sagittal plane (MSP) while a fetal head is in a second orientation.

FIG. 13 is a second example image 1300 of the fetal head volume in a second orientation. the second example image 1300 may be a fetal head volume relative to a first axis 1302, which may be a y-axis, a second axis 1304, which may be an x-axis, and a third axis 1306, which may be a z-axis. The three canonical planes may be the coordinate planes (e.g., an x-y plane, an x-z plane, and a y-z plane). The second example image 1300 may include a MSP 1308 visualized on the fetal head volume. By visualizing the MSP 1308 on the fetal head volume, an angle of inclination of the MSP relative to the first axis 1302 may be visualized.

Figure 14:
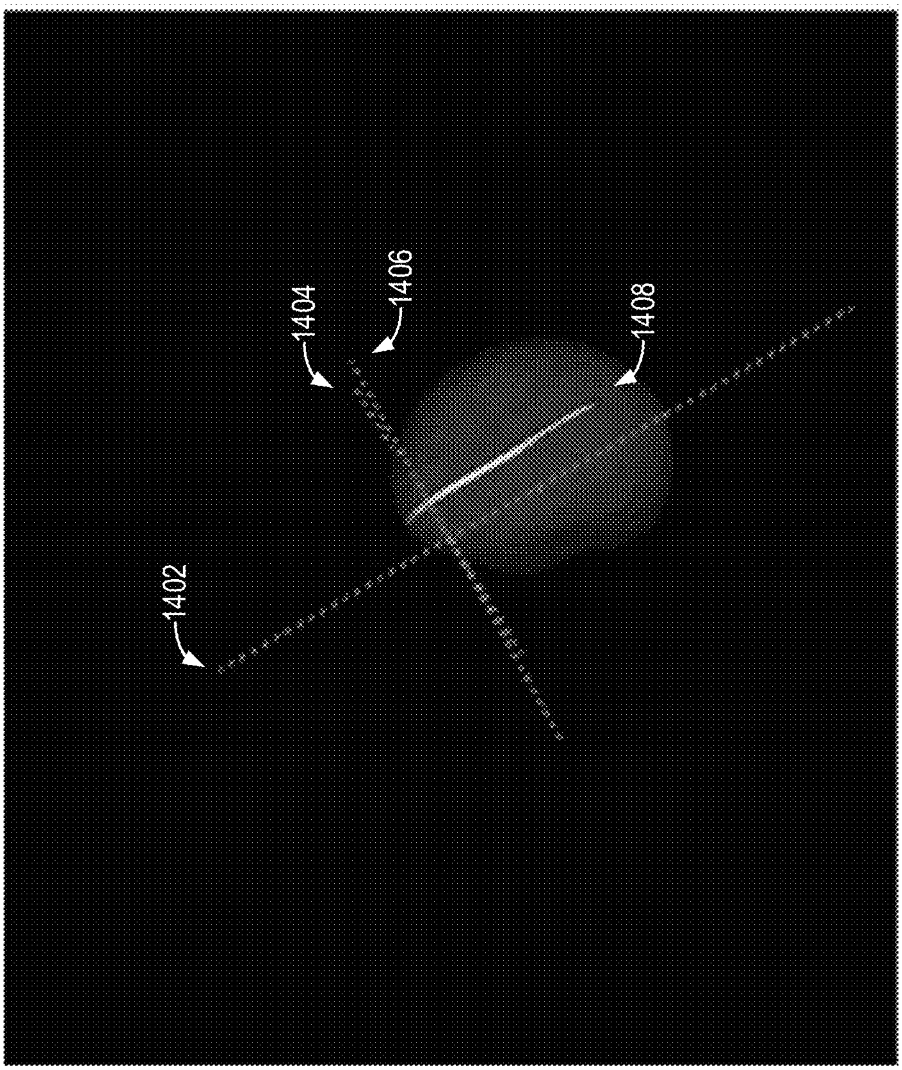
FIG. 14 is an example image of a visualization of a mid-sagittal plane (MSP) while a fetal head is in a third orientation.

FIG. 14 is a third example image 1400 of the fetal head volume in a third orientation. the third example image 1400 may be a fetal head volume relative to a first axis 1402, which may be a y-axis, a second axis 1404, which may be an x-axis, and a third axis 1406, which may be a z-axis. The three canonical planes may be the coordinate planes (e.g., an x-y plane, an x-z plane, and a y-z plane). The third example image 1400 may include a MSP 1408 visualized on the fetal head volume. By visualizing the MSP 1408 on the fetal head volume, an angle of inclination of the MSP relative to the first axis 1402 may be visualized. As shown in the third example image 1400, the MSP 1408 is parallel with the y-z plane.

Figure 15:
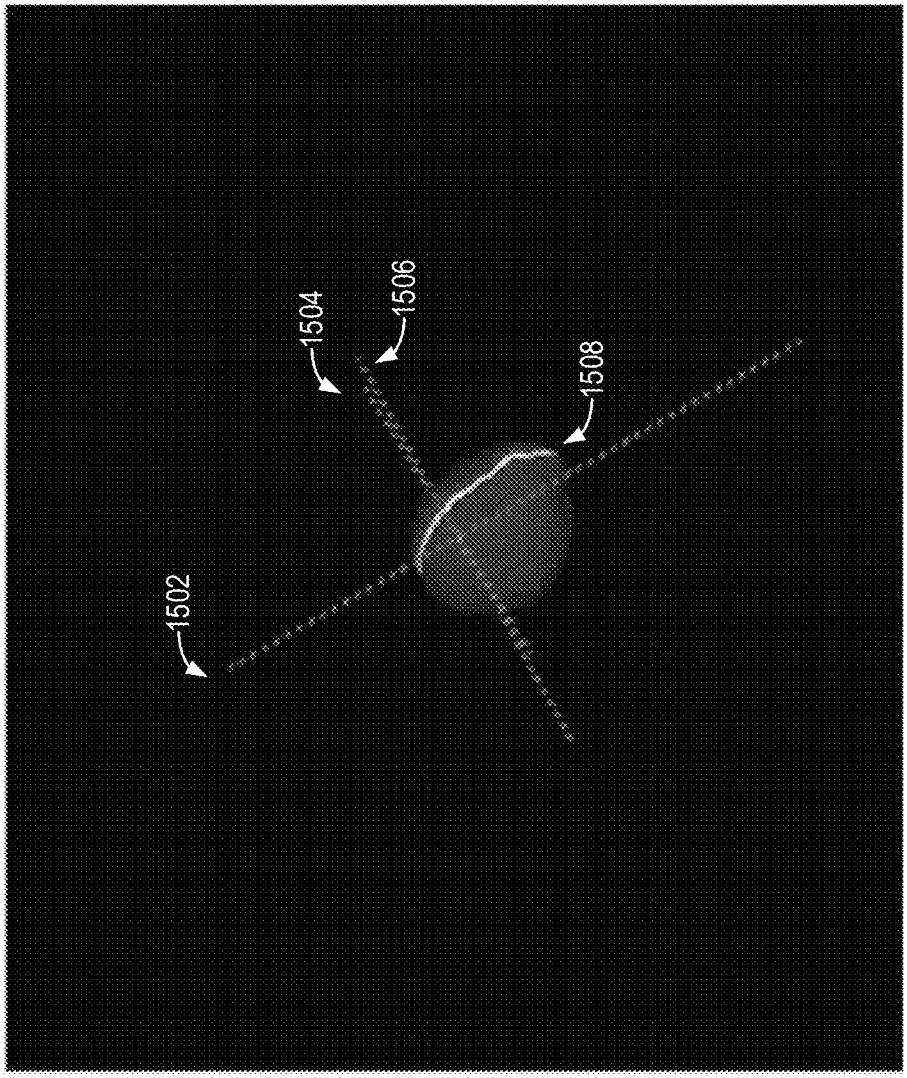
FIG. 15 is an example image of a visualization of a mid-sagittal plane (MSP) while a fetal head is in a fourth orientation.

FIG. 15 is a fourth example image 1500 of the fetal head volume in a fourth orientation. the fourth example image 1500 may be a fetal head volume relative to a first axis 1502, which may be a y-axis, a second axis 1504, which may be an x-axis, and a third axis 1506, which may be a z-axis. The three canonical planes may be the coordinate planes (e.g., an x-y plane, an x-z plane, and a y-z plane). The fourth example image 1500 may include a MSP 1508 visualized on the fetal head volume. By visualizing the MSP 1508 on the fetal head volume, an angle of inclination of the MSP relative to the first axis 1502 may be visualized. As appreciated by FIGS. 12-15, the angle of inclination may be estimated via visual inspection or determined analytically and compared with a maximum accepted angle of inclination. In this way, the MSPs may be classified as an acquired plane or an oblique plane according to the embodiments described herein.

The technical effect of identifying a mid-sagittal plane (MSP) of an input volume based on segmented orbits output from a segmentation model and predicting a quality of facial rendering of a fetal head based on whether the identified MSP is an acquired plane is that memory storage may be more efficiently managed. Rather than devoting addresses in memory to ultrasound data that generates 3D volumes of a fetal head that yield poor facial rendering, the addresses may be dedicated to ultrasound data that generate 3D volumes of acceptable quality and enable medical professionals to monitor development of the fetal head. Additionally, a duration of a scanning session to acquire the ultrasound data may be reduced for both a patient and a sonographer since the sonographer is alerted when poor facial rendering is expected before displaying the 3D volume and may reacquire the ultrasound data accordingly.

The disclosure also provides support for a method, comprising: obtaining an input volume acquired with an ultrasound imaging system, identifying a mid-sagittal plane (MSP) of a fetal head using a first orbit and a second orbit, visually displaying the MSP on the fetal head, in response to determining the MSP is not an acquired plane, alerting a user of poor facial rendering or a possibility of poor facial rendering and prompting the user to reorient an ultrasound probe and reacquire the input volume, and displaying the input volume and/or saving the input volume in memory. In a first example of the method, ultrasound data used to generate the input volume is acquired with a stationary ultrasound probe. In a second example of the method, optionally including the first example, the fetal head is a segmented fetal head, and wherein the first orbit is a first segmented orbit and the second orbit is a second segmented orbit, and wherein identifying the MSP of the segmented fetal head comprises: entering the input volume as input to a segmentation model trained to output a segmentation mask that identifies the segmented fetal head, the first segmented orbit, and the second segmented orbit, and analytically determining a plane perpendicular to a vector connecting centroids of the first segmented orbit and the second segmented orbit. In a third example of the method, optionally including one or both of the first and second examples, the plane is equidistant to the first segmented orbit and the second segmented orbit and is orthogonal to the vector connecting the centroids of the first segmented orbit and the second segmented orbit.

In a fourth example of the method, optionally including one or more or each of the first through third examples, the plane is determined analytically with a vector equation wherein the vector equation comprises a point on the plane and the vector connecting the centroids of the first segmented orbit and the second segmented orbit. In a fifth example of the method, optionally including one or more or each of the first through fourth examples, the acquired plane is either co-planar with an azimuthal plane or at an angle of inclination relative to the azimuthal plane, the angle of inclination being within an angle threshold. In a sixth example of the method, optionally including one or more or each of the first through fifth examples, the angle threshold ranges from 0° to a maximum accepted angle. In a seventh example of the method, optionally including one or more or each of the first through sixth examples, the segmentation model comprises a deep learning model trained with a plurality of training pairs, each training pair including an annotated training input volume and a ground truth segmentation and wherein a respective annotation of each annotated training input volume indicates a segmentation for a fetal head, a first orbit, and a second orbit in each annotated training input volume.

The disclosure also provides support for a system, comprising: one or more processors, and memory storing instructions executable by the one or more processors to: obtain an image at a first energy level, the image reconstructed from projection data acquired at a single peak energy level, obtain an input volume acquired with an ultrasound imaging system, identify a mid-sagittal plane (MSP) of a segmented fetal head, visually display the MSP on the segmented fetal head, in response to determining the MSP is not an acquired plane, alert a user of poor facial rendering or a possibility of poor facial rendering and prompting the user to reorient an ultrasound probe and reacquire the input volume, and display the input volume and/or save the input volume in memory. In a first example of the system, identifying the MSP of the segmented fetal head is based on output from a segmentation model that identifies the segmented fetal head, a first segmented orbit, and a second segmented orbit. In a second example of the system, optionally including the first example, determining the MSP is not the acquired plane comprises: determining an angle of inclination of the MSP relative to one of three canonical planes, and determining whether the angle of inclination of the MSP is within an angle threshold by comparing the angle of inclination with a maximum accepted angle of inclination.

In a third example of the system, optionally including one or both of the first and second examples, training of the segmentation model comprises: receiving a plurality of annotated training input volumes in various orientations, each annotated training input volume annotated with a ground truth segmentation, the ground truth segmentation including a fetal head, a first orbit, and a second orbit, selecting an annotated training input volume from the plurality of annotated training input volumes, inputting the annotated training input volume to the segmentation model, receiving the segmented fetal head, at least the first segmented orbit, and at least the second segmented orbit output from the segmentation model, and comparing the ground truth segmentation and output segmented fetal head, the first segmented orbit, and the second segmented orbit and adjusting model parameters via backpropagation.

In a fourth example of the system, optionally including one or more or each of the first through third examples, training of the segmentation model further comprises: in response to the segmentation model identifying more than two segmented orbits, combining all segmented orbits located near a first region to form the first segmented orbit and combining all segmented orbits located near a second region to form the second segmented orbit. In a fifth example of the system, optionally including one or more or each of the first through fourth examples, the various orientations include the segmented fetal head being in various positions relative to three canonical planes, each canonical plane being orthogonal to the other canonical planes.

The disclosure also provides support for a method, comprising: obtaining an input volume of a fetal head, the input volume mapped from two-dimensional (2D) slices generated from ultrasound data acquired with an ultrasound imaging system, entering the input volume as input to a segmentation model trained to output a segmented fetal head without clutter artifacts and at least two segmented orbits, identifying a mid-sagittal plane (MSP) of the fetal head by analytically determining a plane orthogonal to a vector between the at least two segmented orbits, visually displaying the MSP on the segmented fetal head and determining an angle of inclination of the MSP relative to a canonical plane, the canonical plane being one of three canonical planes, in response to the MSP being identified as an oblique plane, alerting a user of poor facial rendering or a possibility of poor facial rendering and prompting the user to reorient an ultrasound probe and reacquire the input volume, and displaying the input volume on a display device and/or saving the input volume in memory.

In a first example of the method, the method further comprises: prompting the user to reorient the ultrasound probe and reacquire the input volume in response to the segmentation model outputting more than two segmented orbits. In a second example of the method, optionally including the first example, the at least two segmented orbits output from the segmentation model include a first segmented orbit located in a first region and a second segmented orbit located in a second region. In a third example of the method, optionally including one or both of the first and second examples, the first segmented orbit located in the first region is a combination of pixels corresponding to more than one segmented orbit located in the first region.

In a fourth example of the method, optionally including one or more or each of the first through third examples, the second segmented orbit located in the first region is a combination of pixels corresponding to more than one segmented located in the second region. In a fifth example of the method, optionally including one or more or each of the first through fourth examples, the angle of inclination of the MSP is estimated based on visual inspection by the user or determined analytically based on an equation comprising a first normal vector of the MSP and a second normal vector of the respective canonical plane, the first normal vector being the vector between the at least two segmented orbits.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method, comprising:

obtaining an input volume acquired with an ultrasound imaging system;

identifying a mid-sagittal plane (MSP) of a fetal head using a first orbit and a second orbit, wherein the fetal head is a segmented fetal head, and wherein the first orbit is a first segmented orbit and the second orbit is a second segmented orbit, and wherein identifying the MSP of the segmented fetal head comprises:

entering the input volume as input to a segmentation model trained to output a segmentation mask that identifies the segmented fetal head, the first segmented orbit, and the second segmented orbit; and analytically determining a plane perpendicular to a vector connecting centroids of the first segmented orbit and the second segmented orbit, wherein the plane is equidistant to the first segmented orbit and the second segmented orbit and is orthogonal to the vector connecting the centroids of the first segmented orbit and the second segmented orbit, wherein the plane is determined analytically with a vector equation wherein the vector equation comprises a point on the plane and the vector connecting the centroids of the first segmented orbit and the second segmented orbit;

visually displaying the MSP on the fetal head;

in response to determining the MSP is not an acquired plane that is coplanar with or at an angle of inclination with one of three canonical planes, alerting a user of poor facial rendering or a possibility of poor facial rendering and prompting the user to reorient an ultrasound probe and reacquire the input volume; and displaying the input volume and/or saving the input volume in memory.

2. The method of claim 1, wherein ultrasound data used to generate the input volume is acquired with a stationary ultrasound probe.

3. The method of claim 1, wherein the angle threshold ranges from 0° to a maximum accepted angle.

4. The method of claim 1, wherein the segmentation model comprises a deep learning model trained with a plurality of training pairs, each training pair including an annotated training input volume and a ground truth segmentation and wherein a respective annotation of each annotated training input volume indicates a segmentation for a fetal head, a first orbit, and a second orbit in each annotated training input volume.

5. A system, comprising:

one or more processors; and memory storing instructions executable by the one or more processors to:

obtain an input volume acquired with an ultrasound imaging system;

identify a mid-sagittal plane (MSP) of a segmented fetal head based on output from a segmentation model that identifies the segmented fetal head, a first segmented orbit, and a second segmented orbit, wherein training the segmentation model comprises in response to the segmentation model identifying more than two segmented orbits, combining all segmented orbits located near a first region to form the first segmented orbit and combining all segmented orbits located near a second region to form the second segmented orbit, wherein the first region and the second region comprise different numbers of potential orbits, and the first segmented orbit and the second segmented orbit are generated by merging different numbers of potential orbits;

visually display the MSP on the segmented fetal head;

in response to determining the MSP is not an acquired plane, alert a user of poor facial rendering or a possibility of poor facial rendering and prompting the user to reorient an ultrasound probe and reacquire the input volume; and display the input volume and/or save the input volume in memory.

6. The system of claim 5, wherein determining the MSP is not the acquired plane comprises:

determining an angle of inclination of the MSP relative to one of three canonical planes; and determining whether the angle of inclination of the MSP is within an angle threshold by comparing the angle of inclination with a maximum accepted angle of inclination.

7. The system of claim 5, wherein training of the segmentation model further comprises:

receiving a plurality of annotated training input volumes in various orientations, each annotated training input volume annotated with a ground truth segmentation, the ground truth segmentation including a fetal head, a first orbit, and a second orbit;

selecting an annotated training input volume from the plurality of annotated training input volumes;

inputting the annotated training input volume to the segmentation model;

receiving the segmented fetal head, at least the first segmented orbit, and at least the second segmented orbit output from the segmentation model; and comparing the ground truth segmentation and output segmented fetal head, the first segmented orbit, and the second segmented orbit and adjusting model parameters via backpropagation.

8. The system of claim 7, wherein the various orientations include the segmented fetal head being in various positions relative to three canonical planes, each canonical plane being orthogonal to the other canonical planes.

9. A method, comprising:

obtaining an input volume of a fetal head, the input volume mapped from two-dimensional (2D) slices generated from ultrasound data acquired with an ultrasound imaging system;

entering the input volume as input to a segmentation model trained to output a segmented fetal head without clutter artifacts and at least two segmented orbits;

identifying a mid-sagittal plane (MSP) of the fetal head by analytically determining a plane orthogonal to a vector between the at least two segmented orbits;

visually displaying the MSP on the segmented fetal head and determining an angle of inclination of the MSP relative to a canonical plane, the canonical plane being one of three canonical planes;

in response to the MSP being identified as an oblique plane, alerting a user of poor facial rendering or a possibility of poor facial rendering and prompting the user to reorient an ultrasound probe and reacquire the input volume;

displaying the input volume on a display device and/or saving the input volume in memory; and prompting the user to reorient the ultrasound probe and reacquire the input volume in response to the segmentation model outputting more than two segmented orbits.

10. The method of claim 9, wherein the at least two segmented orbits output from the segmentation model include a first segmented orbit located in a first region and a second segmented orbit located in a second region.

11. The method of claim 10, wherein the first segmented orbit located in the first region is a combination of pixels corresponding to more than one segmented orbit located in the first region.

12. The method of claim 10, wherein the second segmented orbit located in the first region is a combination of pixels corresponding to more than one segmented located in the second region.

13. The method of claim 9, wherein the angle of inclination of the MSP is estimated based on visual inspection by the user or determined analytically based on an equation comprising a first normal vector of the MSP and a second normal vector of the respective canonical plane, the first normal vector being the vector between the at least two segmented orbits.

* * * * *